United States Patent
Kurokawa et al.

(10) Patent No.: US 12,422,027 B2
(45) Date of Patent: Sep. 23, 2025

(54) SPRING EXPANSION/COMPRESSION MECHANISM, ROBOT, AND ELECTRONIC DEVICE

(71) Applicant: Sony Group Corporation, Tokyo (JP)

(72) Inventors: Kanako Kurokawa, Tokyo (JP); Nobuki Oshima, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 119 days.

(21) Appl. No.: 18/546,978

(22) PCT Filed: Jan. 21, 2022

(86) PCT No.: PCT/JP2022/002119
§ 371 (c)(1),
(2) Date: Aug. 18, 2023

(87) PCT Pub. No.: WO2022/185767
PCT Pub. Date: Sep. 9, 2022

(65) Prior Publication Data
US 2024/0133452 A1   Apr. 25, 2024
US 2024/0229905 A9   Jul. 11, 2024

(30) Foreign Application Priority Data
Mar. 2, 2021 (JP) .................. 2021-032809

(51) Int. Cl.
*F16D 7/02* (2006.01)
*F16H 19/06* (2006.01)
(Continued)

(52) U.S. Cl.
CPC ......... *F16H 19/06* (2013.01); *F16H 25/2454* (2013.01); *H02K 7/116* (2013.01); *A61H 23/0254* (2013.01)

(58) Field of Classification Search
CPC ................. F16D 13/76; F16D 7/024
(Continued)

(56) References Cited

U.S. PATENT DOCUMENTS 10,087,994 B2 * 10/2018 Serkh ............. F16D 7/022
10,724,507 B2    7/2020 Cho
2015/0352454 A1 12/2015 Barse

FOREIGN PATENT DOCUMENTS

CN   102431603 A   5/2012
JP   S59-073655 A  4/1984
(Continued)

OTHER PUBLICATIONS

International Search Report and Written Opinion mailed on Mar. 15, 2022, received for PCT Application PCT/JP2022/002119, filed on Jan. 21, 2022, 8 pages including English Translation.

*Primary Examiner* — Randell J Krug
(74) *Attorney, Agent, or Firm* — XSENSUS, LLP

(57) ABSTRACT

A spring expansion/compression mechanism (SM) includes an outer ring (OR), a wire (WR), a spring (SP), and an outer-ring drive mechanism (RPT). The wire (WR) is connected to the outer surface of the outer ring (OR). The spring (SP) is connected to the outer ring (OR) via the wire (WR). The spring (SP) is compressed when the wire (WR) is wound around the outer ring (OR). The outer-ring drive mechanism (RPT) comes into close contact with the outer ring (OR) to transmit rotary power to the outer ring (OR). The outer-ring drive mechanism (RPT) releases the outer ring (OR) from the close contact to cause the outer ring (OR) to freely rotate.

14 Claims, 23 Drawing Sheets

(51) Int. Cl.
    *F16H 25/24*      (2006.01)
    *H02K 7/116*      (2006.01)
    *A61H 23/02*      (2006.01)
(58) Field of Classification Search
    USPC .......................................................... 74/25
    See application file for complete search history.

(56)               References Cited

FOREIGN PATENT DOCUMENTS

JP         2012-066323  A     4/2012
JP         2015-229113  A    12/2015
JP         2019-513958  A     5/2019
KR         20110035129  A     4/2011
KR           101166870  B1    7/2012

\* cited by examiner

FIG.23
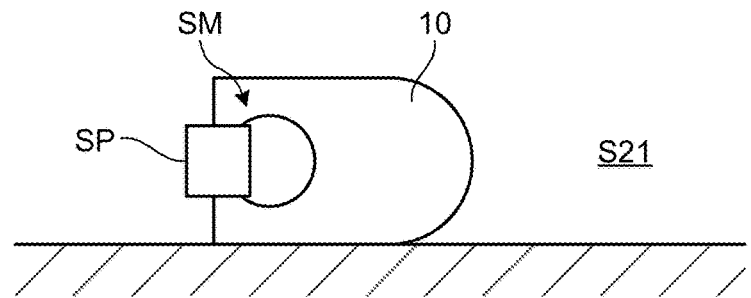
S21
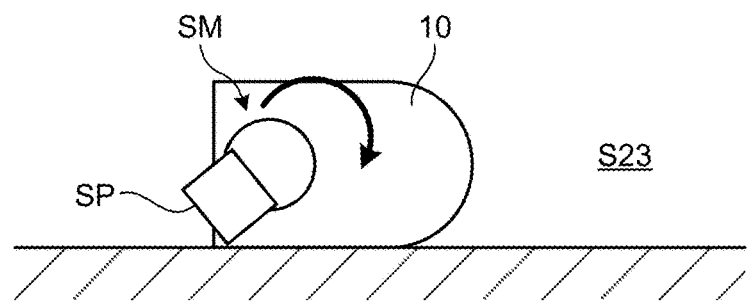
S23
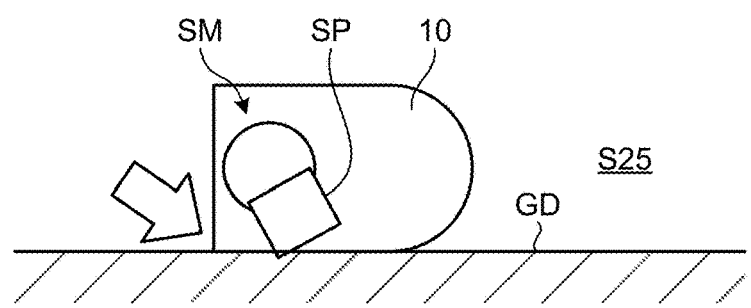
S25
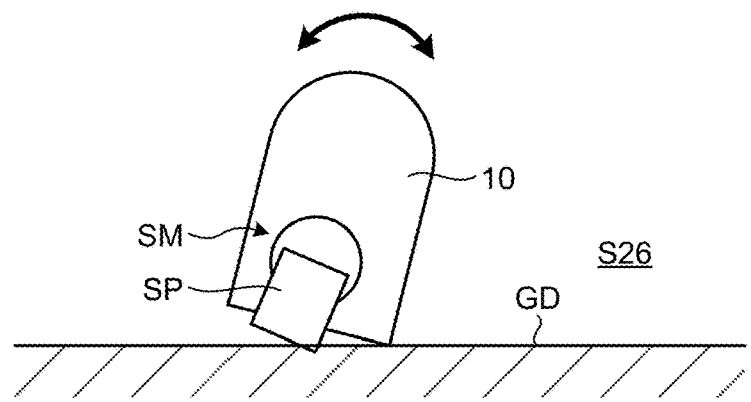
S26

SPRING EXPANSION/COMPRESSION MECHANISM, ROBOT, AND ELECTRONIC DEVICE

CROSS-REFERENCE TO RELATED APPLICATIONS

The present application is based on PCT filing PCT/JP2022/002119, filed Jan. 21, 2022, which claims priority to Japanese Patent Application No. 2021-032809, filed Mar. 2, 2021, the contents of each are hereby incorporated by reference.

FIELD

The present invention relates to a spring expansion/compression mechanism, a robot, and an electronic device.

BACKGROUND

A spring expansion/compression mechanism capable of winding and unwinding a spring with only one kind of power by using a cam and an arm is known (see Patent Literature 1).

CITATION LIST

Patent Literature

Patent Literature 1: JP 2015-229113 A

SUMMARY

Technical Problem

According to the method described above, great force is applied to the cam when the spring is unwound. Thus, the cam is susceptible to failure. Further, the diameter of the cam increases on the basis of a deflection amount of the spring, which makes it difficult to downsize a device. Moreover, there is also a problem of incapability of adjusting a deflection amount of the spring.

In view of this, the present disclosure proposes a spring expansion/compression mechanism, a robot, and an electronic device that are small and are less susceptible to failure while being capable of adjusting a deflection amount of a spring.

Solution to Problem

According to the present disclosure, a spring expansion/compression mechanism is provided that comprises: an outer ring; a wire connected to an outer surface of the outer ring; a spring that is connected to the outer ring via the wire and is compressed when the wire is wound around the outer ring; and an outer-ring drive mechanism configured to come into close contact with the outer ring to transmit rotary power to the outer ring, and release the outer ring from the close contact to cause the outer ring to freely rotate. According to the present disclosure, a robot and an electronic device are provided each of which comprises: the spring expansion/compression mechanism; and an operation control unit configured to control the spring expansion/compression mechanism.

BRIEF DESCRIPTION OF DRAWINGS

FIG. 23 is a view illustrating an example in which the spring expansion/compression mechanism is used for an operation of recovering from an overturned state.

DESCRIPTION OF EMBODIMENTS

Hereinafter, embodiments of the present disclosure will be described in detail with reference to the drawings. In each of the following embodiments, the same components are denoted by the same reference signs, and duplicated description will be omitted.

The description will be given in the following order.
[1. Spring expansion/compression mechanism]
 [1-1. Configuration of spring expansion/compression mechanism]
 [1-2. Expansion/compression operation of spring]
 [1-3. Effects]
[2. First application example of spring expansion/compression mechanism]
 [2-1. Configuration of robot]
 [2-2. Operation of climbing over obstacle]
 [2-3. Impact absorption at the time of falling]
 [2-4. Operation of recovering from overturned state]
 [2-5. Examples of application to other operations]
 [2-6. Effects]
[3. Second application example of spring expansion/compression mechanism]
 [3-1. Information processing terminal]
 [3-2. Massager]
 [3-3. Sound device]
 [3-4. Futon beater]
 [3-5. Effects]

1. Spring Expansion/Compression Mechanism 1-1. Configuration of Spring Expansion/Compression Mechanism FIGS. 1 to 8 are views illustrating an example of the spring expansion/compression mechanism SM.

Figure 1:
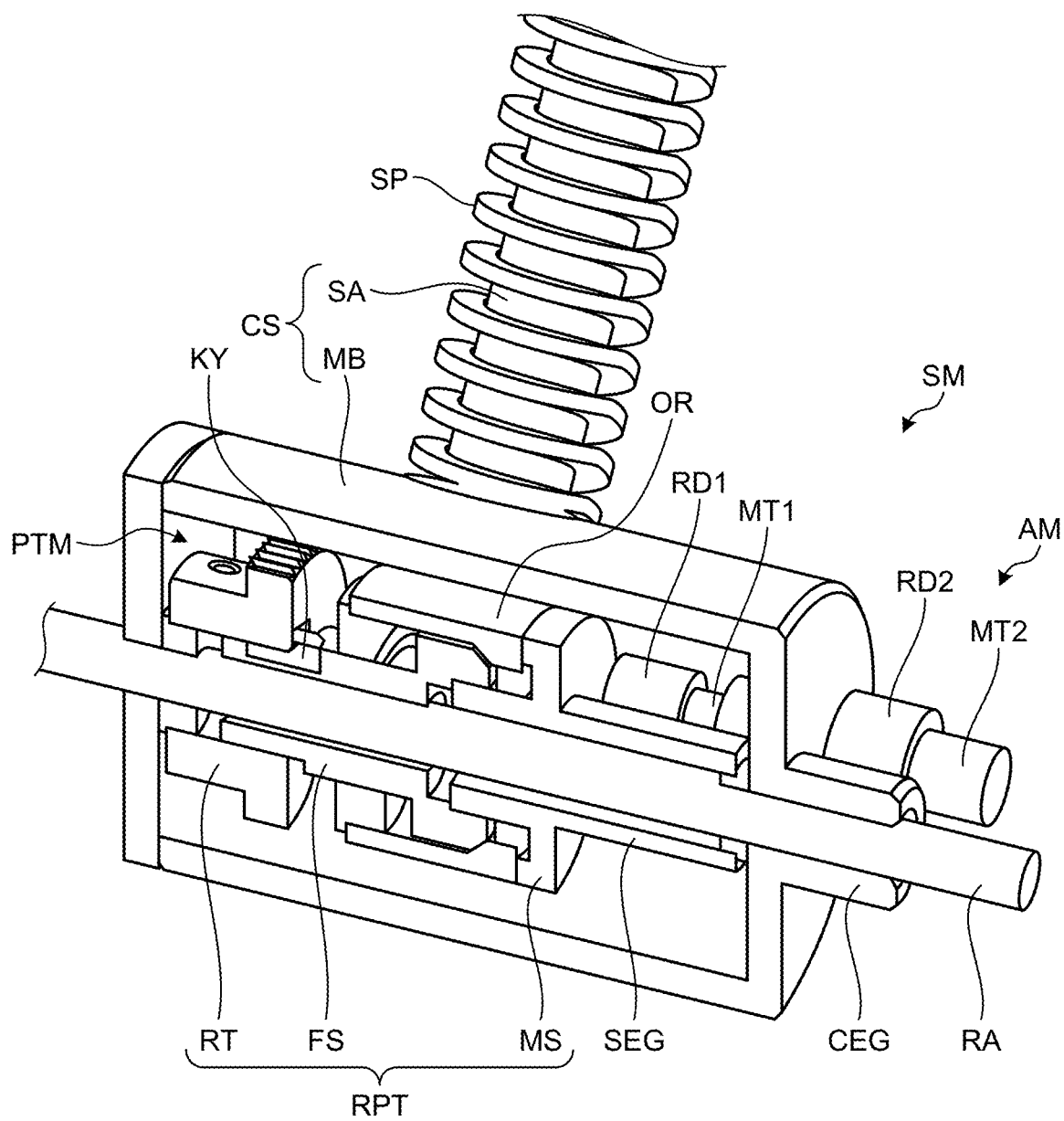
FIG. 1 is a view illustrating an example of a spring expansion/compression mechanism.
Figure 2:
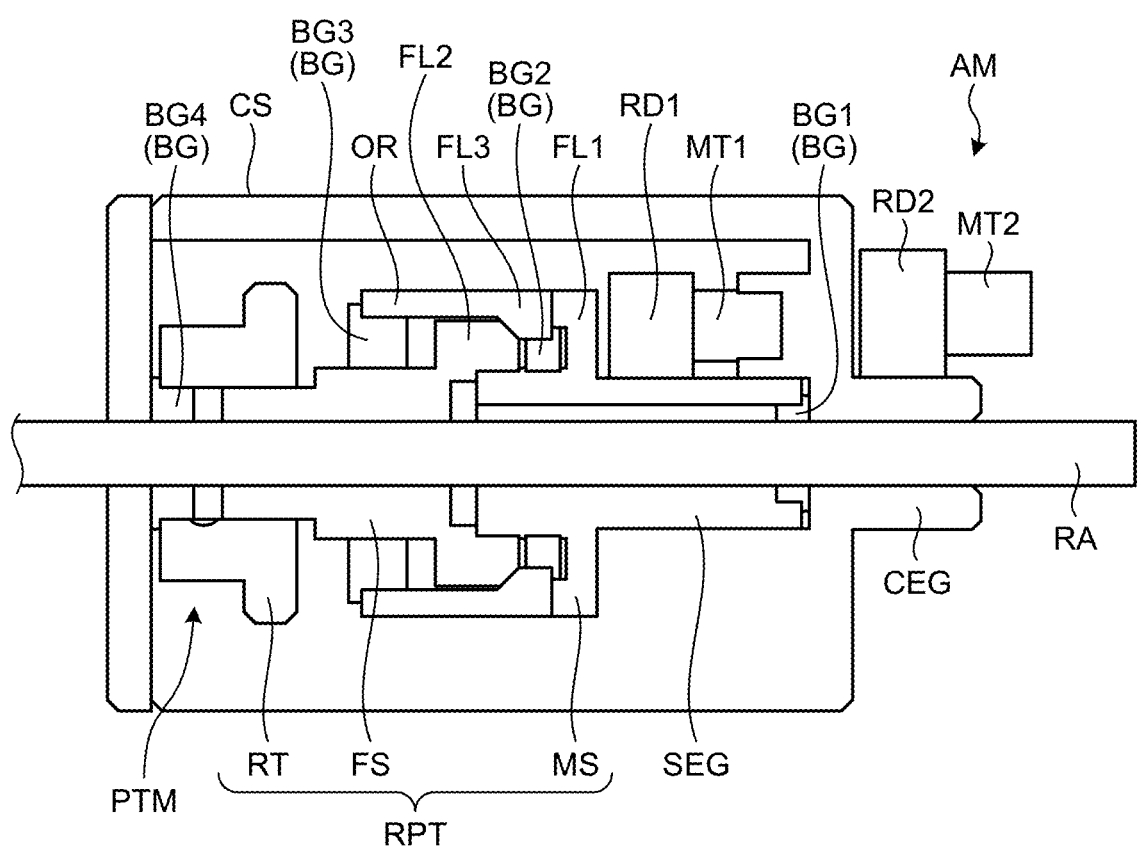
FIG. 2 is a view illustrating the example of the spring expansion/compression mechanism.

As illustrated in FIGS. 1 and 2, the spring expansion/compression mechanism SM includes a first motor MT1, a first speed reducer RD1, a rotary-power transmission mechanism PTM, a spring SP, and an adjustment mechanism AM.

The rotary-power transmission mechanism PTM changes a connection state between the first motor MT1 and the spring SP depending on the rotation direction of the first motor MT1. By a change in the connection state, an operation mode of the spring expansion/compression mechanism SM is switched between a transmission mode and a transmission cancel mode.

The transmission mode is an operation mode in which the first motor MT1 and the spring SP are connected via the rotary-power transmission mechanism PTM and rotary power of the first motor MT1 can be transmitted to the spring SP. In the transmission mode, the spring SP is compressed by rotary power of the first motor MT1. The transmission cancel mode is an operation mode in which the first motor MT1 and the spring SP are disconnected at the rotary-power transmission mechanism PTM and rotary power of the first motor MT1 is not transmitted to the spring SP. In the transmission cancel mode, no stress is applied to the spring SP. Thus, in a case where the spring SP is compressed, the spring SP is released from compression and instantaneously expands until it returns to its natural length.

Figure 3:
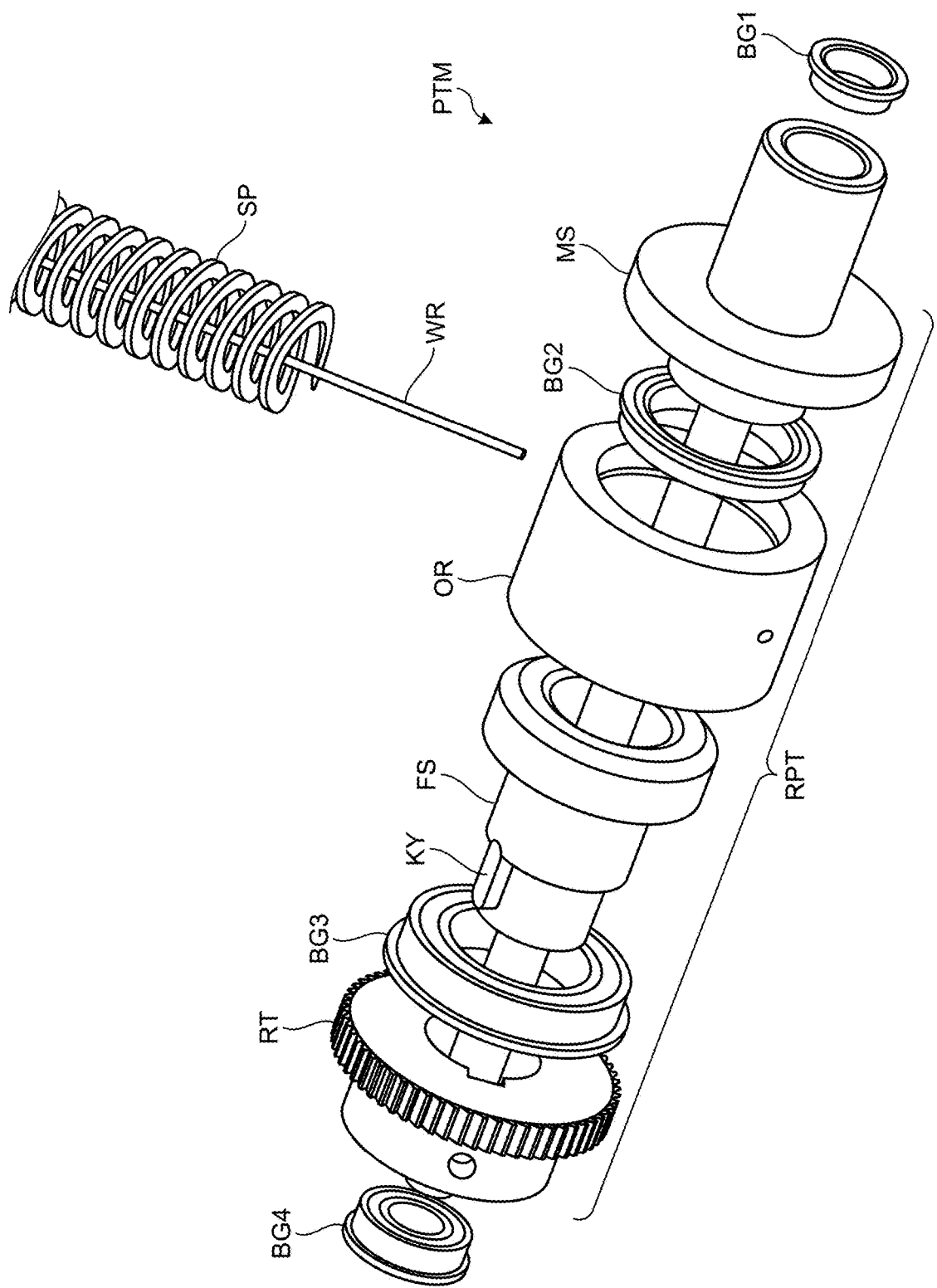
FIG. 3 is a view illustrating the example of the spring expansion/compression mechanism.
Figure 4:
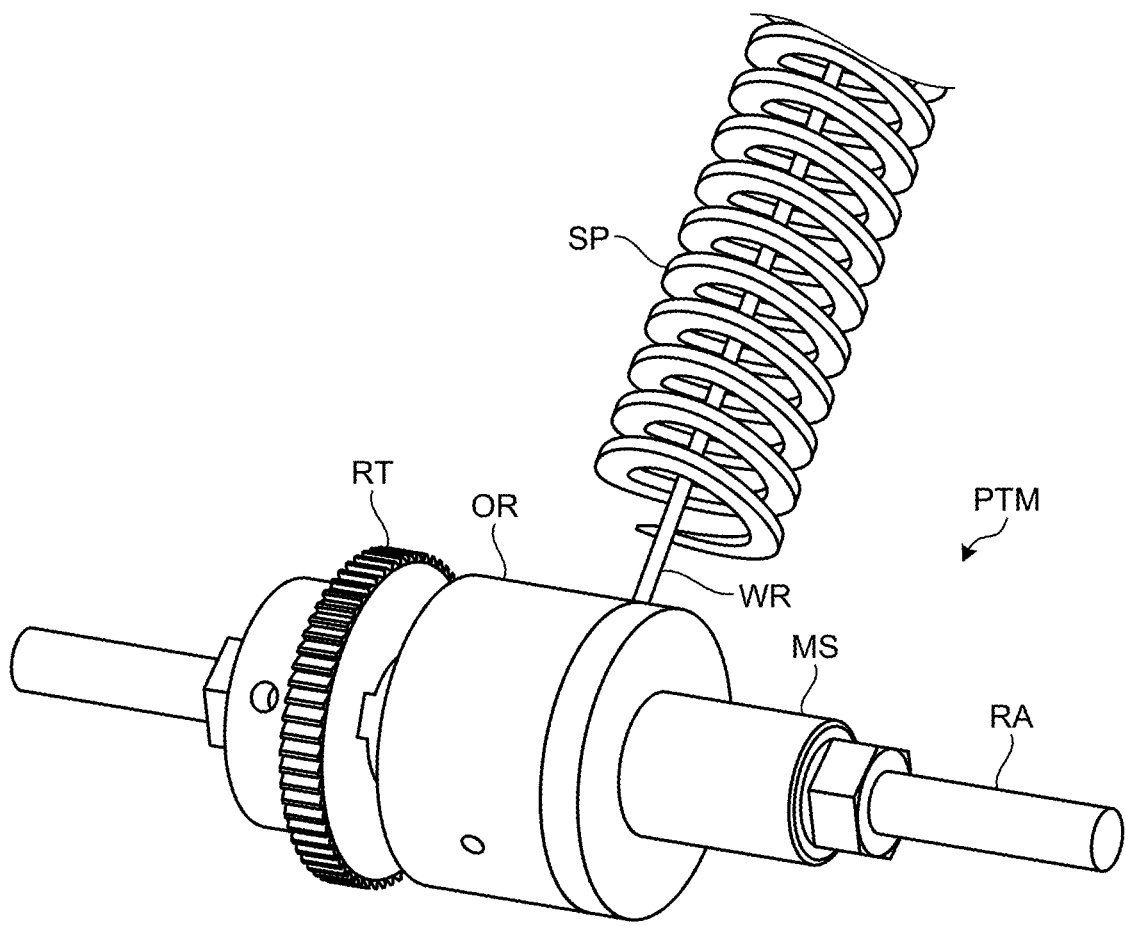
FIG. 4 is a view illustrating the example of the spring expansion/compression mechanism.

As illustrated in FIGS. 1 to 3, the rotary-power transmission mechanism PTM includes a shaft RA, a first screw MS, a second screw FS, an outer ring OR, a ratchet RT, and a plurality of bearings BG (for example, a first bearing BG1 to a fourth bearing BG4). The rotary-power transmission mechanism PTM is connected to the first motor MT1 via the first speed reducer RD1.

Figure 5:
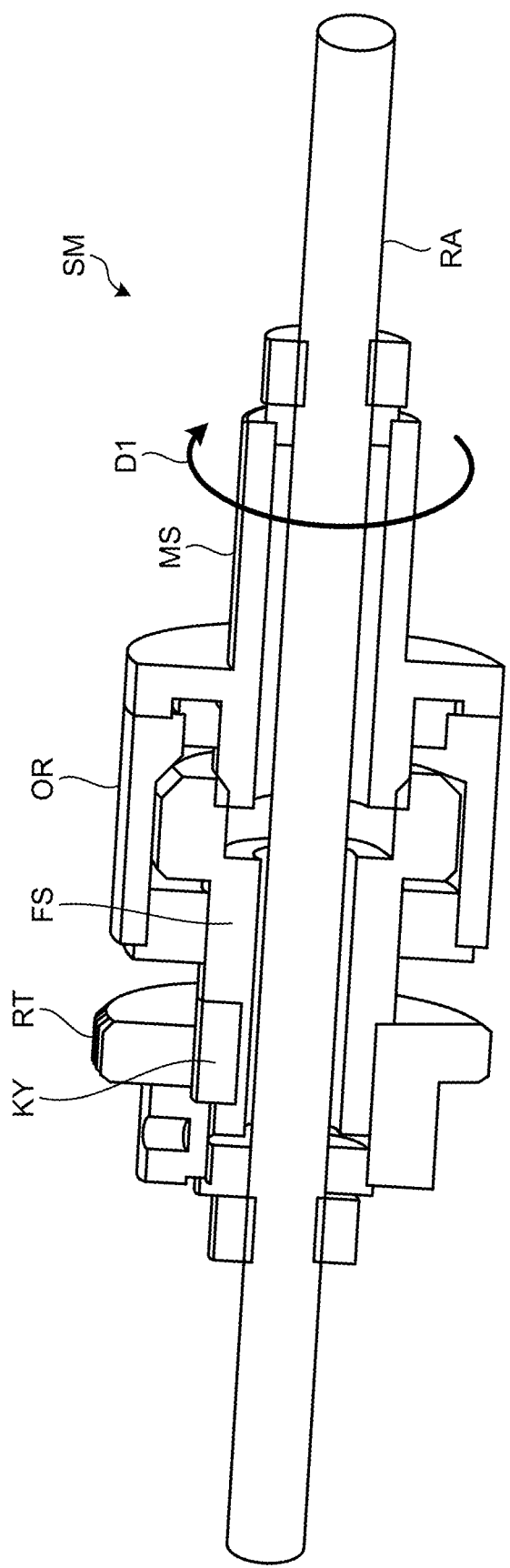
FIG. 5 is a view illustrating the example of the spring expansion/compression mechanism.
Figure 6:
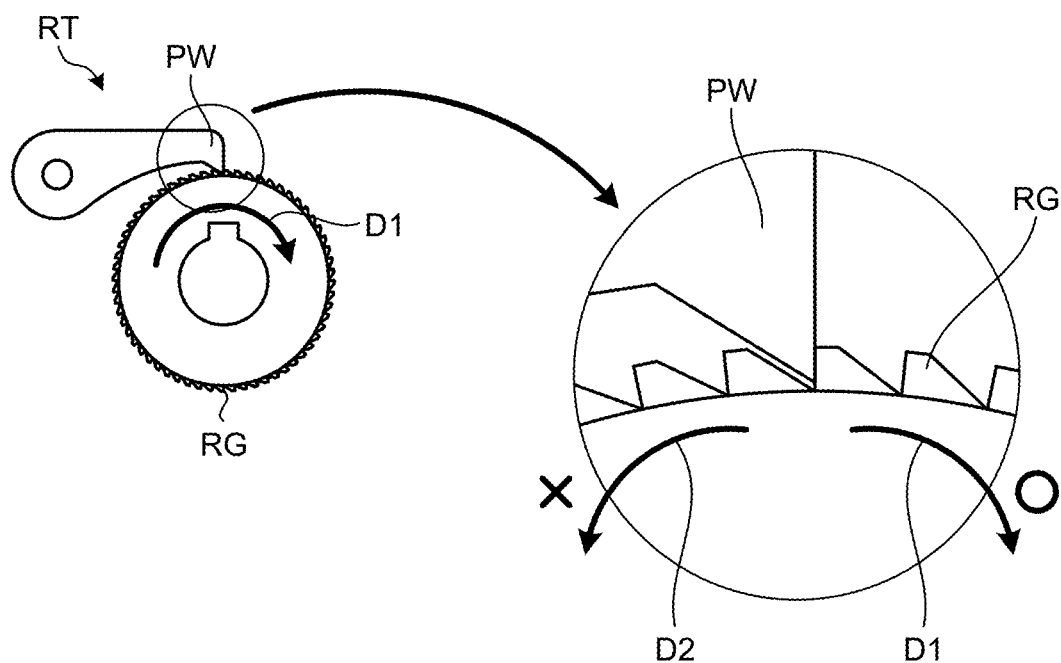
FIG. 6 is a view illustrating the example of the spring expansion/compression mechanism.

The first screw MS is, for example, a male screw. The first screw MS is attached to the shaft RA via the first bearing BG1. A first flange FL1 is provided at an end of the first screw MS on a side opposite to a side closer to the first bearing BG1. A gear portion SEG engaged with the first speed reducer RD1 is provided at an end of the first screw MS on the side closer to the first bearing BG1. Rotary power of the first motor MT1 is transmitted to the first screw MS via the first speed reducer RD1. The rotation direction of the first screw MS is changed by a change in the rotation direction of the first motor MT1. As illustrated in FIGS. 5 and 6, the first motor MT1 can rotate the first screw MS in a first direction D1 and a second direction D2 opposite to the first direction D1.

Hereinafter, rotation of the first motor MT1 in a case where the first screw MS is rotated in the first direction D1 will be referred to as "forward rotation". Rotation of the first motor MT1 in a case where the first screw MS is rotated in the second direction D1 will be referred to as "reverse rotation".

As illustrated in FIGS. 1 and 2, the second screw FS is, for example, a female screw. The second screw FS is threadedly engaged with the first screw MS. A second flange FL2 is provided at an end of the second screw FS on a side closer to the first screw MS. An end of the second screw FS on a side opposite to the side closer to the first screw MS is fitted into the ratchet RT. The ratchet RT is attached to the shaft RA via the fourth bearing BG4. Relative rotation of the second screw FS and the ratchet RT is limited by a key KY. Thus, the second screw FS and the ratchet RT rotate around the shaft RA in conjunction with each other.

As illustrated in FIG. 6, the rotation direction of the ratchet RT is limited to the first direction D1 by a pawl PW and a gear portion RG. The rotation direction of the second screw FS is limited to the first direction D1 by the ratchet RT. The second screw FS and the ratchet RT rotate only in the first direction D1 and do not rotate in the second direction D2 opposite to the first direction D1.

As illustrated in FIGS. 1 to 4, the outer ring OR is provided outside the second screw FS. The spring SP is connected to the outer ring OR via a wire WR. The spring SP is compressed when the wire WR is wound around the outer ring OR.

A third flange FL3 is provided at an end of the outer ring OR on a side closer to the first screw MS. The end of the outer ring OR on the side closer to the first screw MS (the third flange FL3 in the example in FIG. 2) is attached to the first screw MS via the second bearing BG2. An end of the outer ring OR on a side opposite to the first screw MS is attached to the second screw FS via the third bearing BG3. When the first screw MS is rotated in the first direction D1 to be threadedly engaged with the second screw FS strongly, the third flange FL3 is caught between the first flange FL1 and the second flange FL2.

Figure 7:
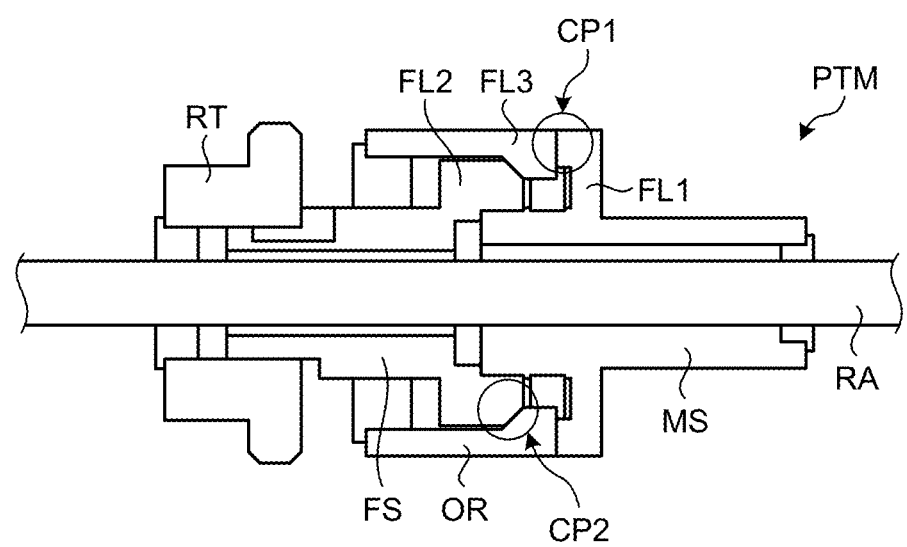
FIG. 7 is a view illustrating the example of the spring expansion/compression mechanism.

In FIG. 7, it is designed such that friction force at a portion of contact between the first flange FL1 and the third flange FL3 (first contact portion CP1) is weak. It is designed such that friction force at a portion of contact between the second flange FL2 and the third flange FL2 (second contact portion CP2) is strong. In the transmission mode, the outer ring OR rotates in conjunction with the first screw MS and the second screw FS due to the strong frictional force at the second contact portion CP2. In the transmission cancel mode, though contact between the first screw MS and the outer ring OR is maintained, rotation of the first screw MS, if it occurs, would not significantly affect the operation of the outer ring OR because of the weak friction force at the first contact portion CP1.

As illustrated in FIGS. 1 to 3, the first screw MS, the second screw FS, and the ratchet RT form an outer-ring drive mechanism RPT. The outer-ring drive mechanism RPT performs switching between transmission and interruption of rotary power to the outer ring OR depending on how close the outer ring OR and the first screw MS and the second screw FS are to each other. For example, in the transmission mode, the outer-ring drive mechanism RPT brings the first screw MS and the second screw FS into close contact with the outer ring OR to transmit rotary power of the first motor MT1 to the outer ring OR. Thus, the wire WR is wound around the outer ring OR, so that the spring SP is compressed. In the transmission cancel mode, the outer-ring drive mechanism RTP releases the outer ring OR from the close contact with the first screw MS and the second screw F to cause the outer ring OR to freely rotate. Consequently, the spring SP is released from compression and instantaneously expands.

Figure 8:
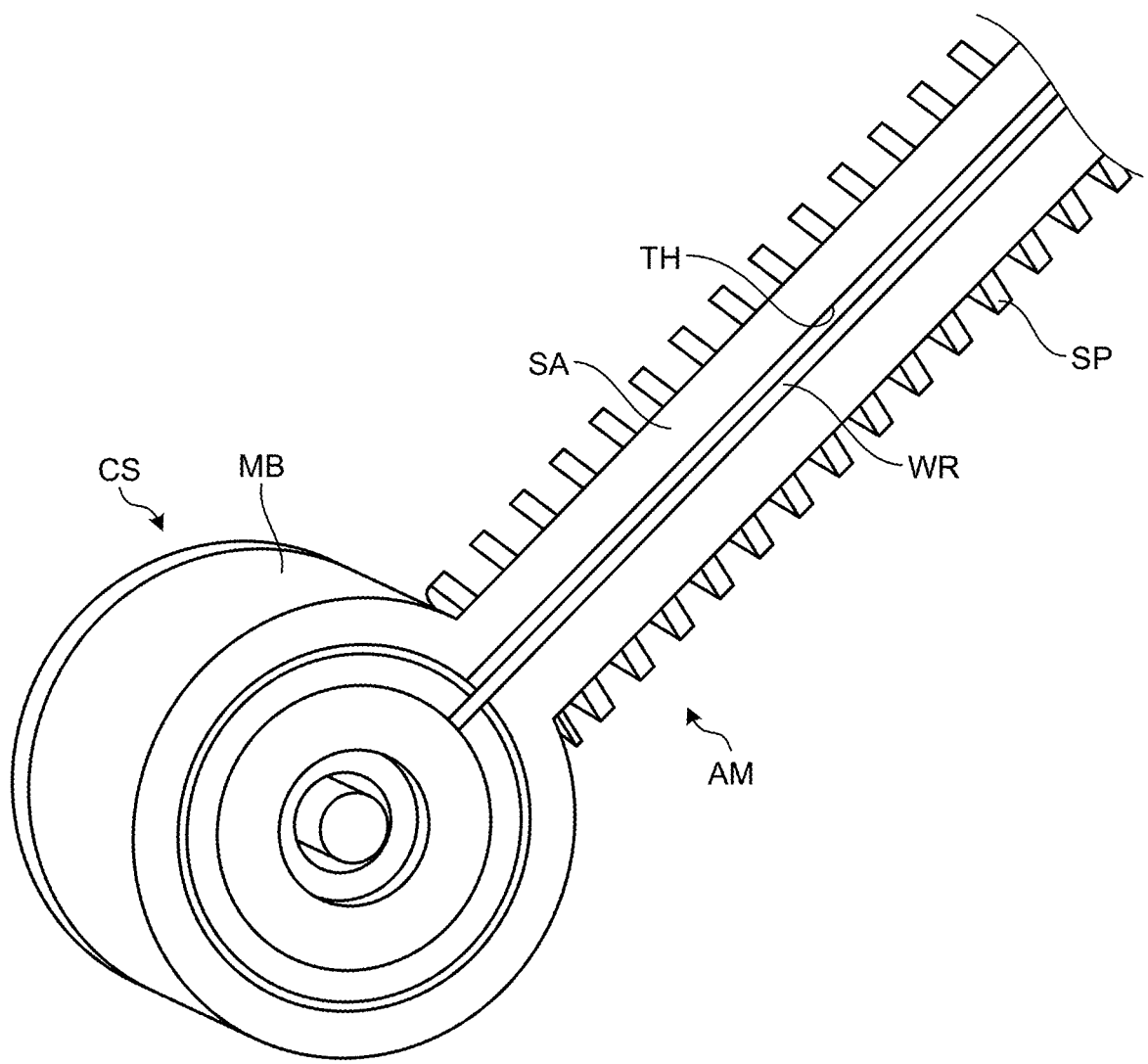
FIG. 8 is a view illustrating the example of the spring expansion/compression mechanism.

As illustrated in FIGS. 1, 2, and 8, the adjustment mechanism AM adjusts the orientation of the spring SP. The adjustment mechanism AM includes a second motor MT2, a second speed reducer RD2, and a casing CS.

The casing CS includes a casing main body MB and a spring shaft SA. The casing main body MB has a tubular structure that accommodates the first motor MT1, the first speed reducer RD1, and the rotary-power transmission mechanism PTM. The casing main body MB is fixed to the shaft RA. The casing main body MB rotates in conjunction with the shaft RA.

The spring shaft SA is provided so as to protrude from the outer surface of the casing main body MB in the radial direction of the casing main body MB (direction perpendicular to the shaft RA). A through hole TH through which the wire WR is inserted is provided at the center of the spring shaft SA. The spring shaft SA has a hollow structure in which the wire WR is inserted along the through hole TH.

The spring SP having a spiral shape is fitted outside the spring shaft SA. An end (first end) of the spring SP on a side closer to the casing main body MB is in contact with the casing main body MB at the base end of the spring shaft SA. The length of the spring SP being uncompressed is larger than the length of the spring shaft SA. The tip end of the spring SP being uncompressed protrudes from the tip end of the spring shaft SA.

One end (first end) of the wire WR is connected to the outer surface of the outer ring OR. The other end (second end) of the wire WR is connected to an end (second end) of the spring SP on a side opposite to the side closer to the casing main body MB. In the transmission mode, the wire WR is wound around the outer ring OR, and the second end of the wire WR pulls the second end of the spring SP toward the casing main body MB. As a result, the spring SP is compressed. In the transmission cancel mode, the outer ring OR is released from being applied with rotary power of the first motor MT1, and the outer ring OR freely rotates. Consequently, the compressed spring SP instantaneously expands and returns to its natural length.

The casing main body MB is provided with a gear portion CEG engaged with the second speed reducer RD2. Rotary power of the second motor MT2 is transmitted to the casing CS via the second speed reducer RD2. The second motor MT2 causes the casing CS to rotate in the circumferential direction of the shaft RA, in conjunction with the first motor MT1, the first speed reducer RD1, the rotary-power transmission mechanism PTM, and the spring SP that are held in the casing CS. Consequently, the orientation of the spring SP is adjusted along the circumferential direction of the shaft PA. The rotation direction of the casing CS is changed by a change in the rotation direction of the second motor MT2.

1-2. Expansion/Compression Operation of Spring

FIGS. 9 to 12 are views illustrating an expansion/compression operation of the spring SP caused by the spring expansion/compression mechanism SM.

Figure 9:
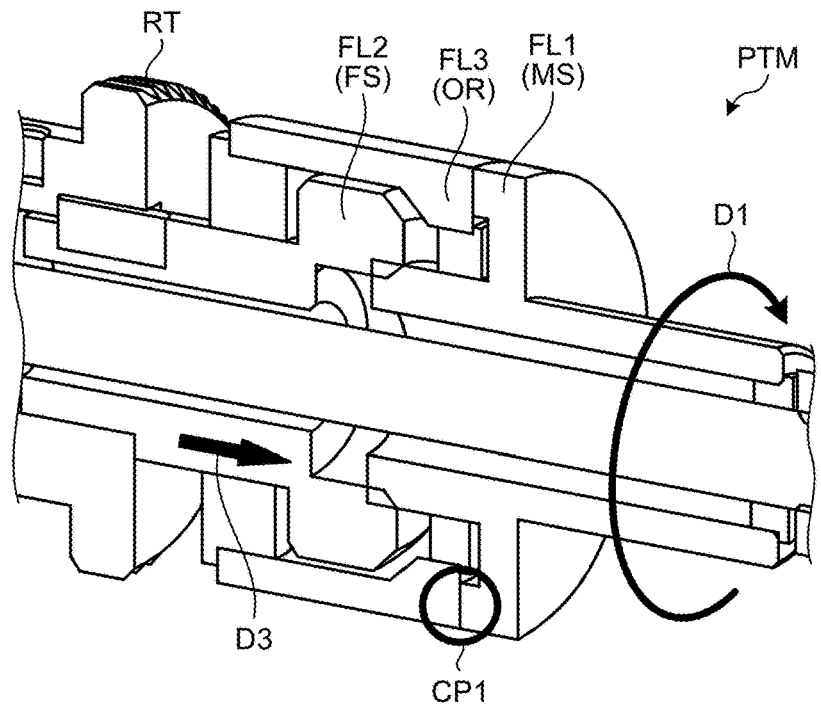
FIG. 9 is a view illustrating an expansion/compression operation of a spring caused by the spring expansion/compression mechanism.

As illustrated in FIG. 9, when the first screw MS is rotated in the first direction D1 by forward rotation of the first motor MT1, the second screw FS is screwed into the first screw MS. As a result, the second screw FS moves in a direction toward the first screw MS (third direction D3). Though the outer ring OR is in contact with the first screw MS at the first contact portion CP1, the rotation of the first screw MS would not cause the outer ring OR to rotate because of the weak frictional force at the first contact portion CP1.

Figure 10:
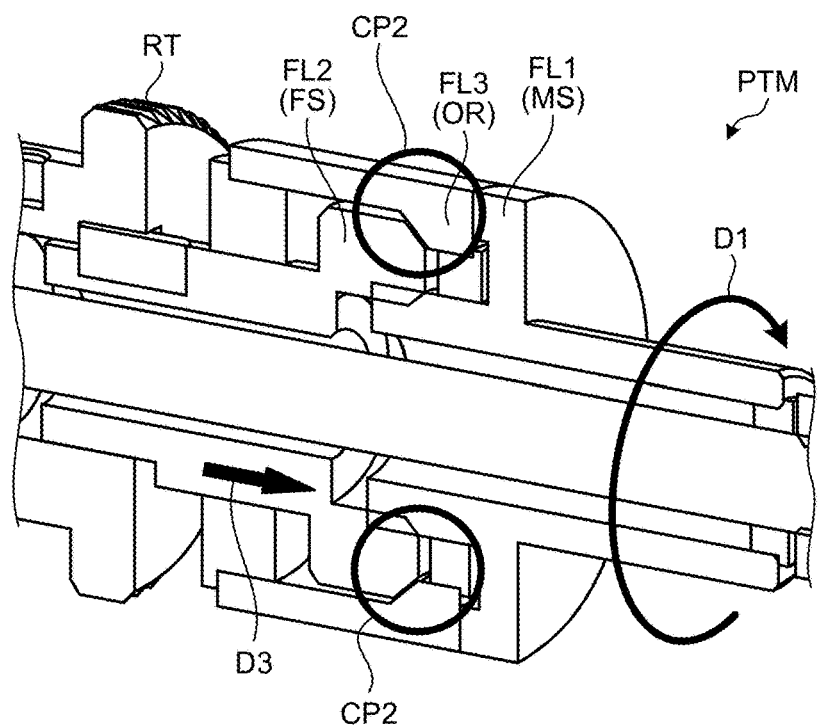
FIG. 10 is a view illustrating the expansion/compression operation of the spring caused by the spring expansion/compression mechanism.

As illustrated in FIG. 10, when the second screw FS moves by a predetermined distance in the third direction D3, the third flange FL3 of the outer ring OR is caught between the first flange FL1 of the first screw MS and the second flange FL2 of the second screw FS. The third flange FL3 comes into very close contact with the first flange FL1 and the second flange FL2, so that the outer ring OR is integrated with the first screw MS and the second screw FS. Because of the strong frictional force between the second flange FL2 and the third flange FL3 at the second contact portion CP2, the outer ring OR has difficulty in rotating relative to the second screw FS. Hence, the outer ring OR is firmly fixed to the second screw FS.

Figure 11:
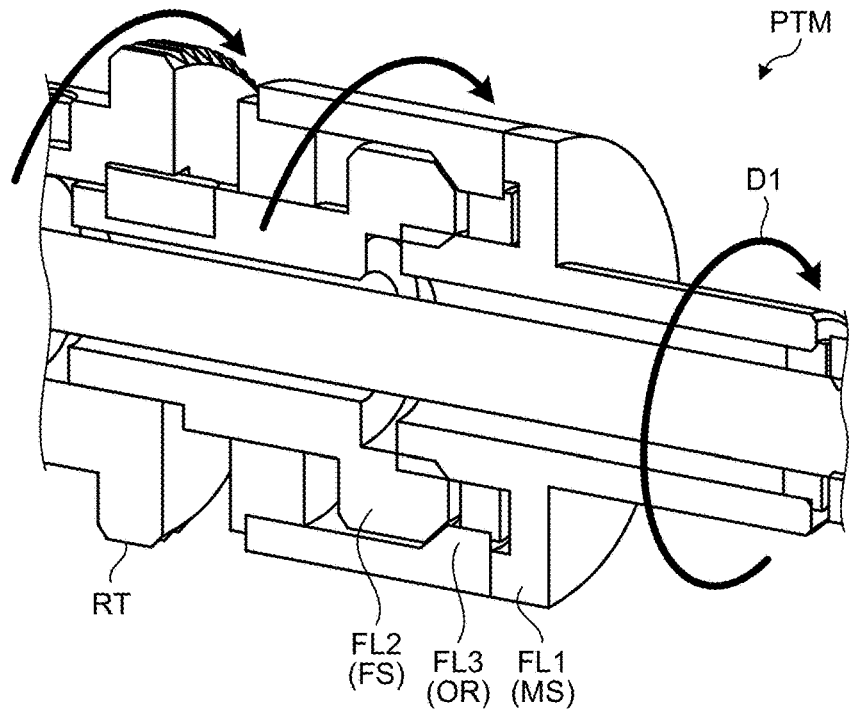
FIG. 11 is a view illustrating the expansion/compression operation of the spring caused by the spring expansion/compression mechanism.

As illustrated in FIG. 11, when the first screw MS further rotates in the first direction D1 with the third flange FL3 being caught between the first flange FL1 and the second flange FL2, the second screw FS, the outer ring OR, and the ratchet RT rotate in the first direction D1 in conjunction with each other as the first screw MS rotates. By the rotation of the outer ring OR, the wire WR connected to the outer ring OR is wound around the outer ring OR. Consequently, the spring SP connected to the wire WR is compressed.

Figure 12:
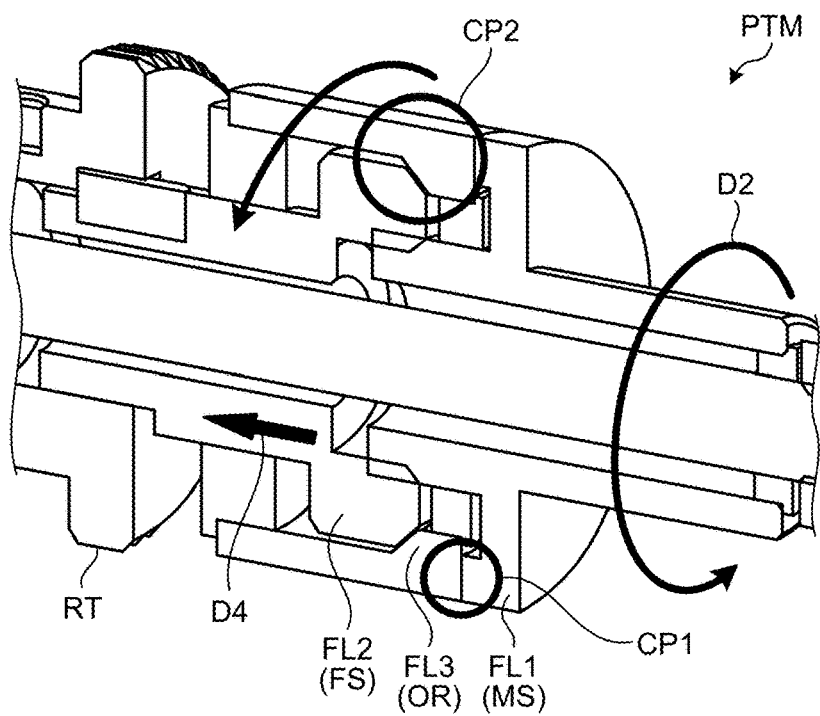
FIG. 12 is a view illustrating the expansion/compression operation of the spring caused by the spring expansion/compression mechanism.

As illustrated in FIG. 12, when the rotation direction of the first motor MT1 is reversed with the spring SP being compressed, the first screw MS rotates in the second direction D2 opposite to the first direction D1. The rotation direction of the second screw FS is limited to the first direction D1 by the ratchet RT. For this reason, the rotation of the first screw MS in the second direction D2 cannot cause the second screw FS to rotate in the second direction in conjunction with the first screw MS, and the second screw FS moves in a direction away from the first screw MS (fourth direction D4). At the second contact portion CP2, a gap is formed between the second flange FL2 and the third flange FL3, and the force of close contact between the third flange FL3 and the first flange FL1 and the second flange FL2 is reduced.

Though the outer ring OR and the first screw MS are kept in contact with each other at the first contact portion CP1, the friction force at the first contact portion CP1 is weak. Thus, the force of close contact between the first screw MS and the outer ring OR is reduced, and in such a state, rotation of the first screw MS would not cause the outer ring OR to rotate. The outer ring OR is disconnected from the outer-ring drive mechanism RPT and can freely rotate. The compressive stress applied to the spring SP via the wire WR is also removed, and the spring SP can freely expand. The outer ring OR rotates as the spring SP expands, but no stress that impedes the rotation of the outer ring OR is generated because of the disconnection of the outer ring OR from the outer-ring drive mechanism RPT. Consequently, the spring SP instantaneously expands and returns to its original length.

1-3. Effects

The spring expansion/compression mechanism SM includes the outer ring OR, the wire WR, the spring SP, and the outer-ring drive mechanism RPT. The wire WR is connected to the outer surface of the outer ring OR. The spring SP is connected to the outer ring OR via a wire WR. The spring SP is compressed when the wire WR is wound around the outer ring OR. The outer-ring drive mechanism RPT comes into close contact with the outer ring OR to transmit rotary power to the outer ring OR. The outer-ring drive mechanism RPT releases the outer ring OR from the close contact, to cause the outer ring OR to freely rotate.

With this configuration, switching between transmission and interruption of rotary power is performed depending on how close the outer-ring drive mechanism RPT and the outer ring OR are to each other. In a state in which the force of close contact between the outer-ring drive mechanism RPT and the outer ring OR is reduced, the connection between the spring SP and the outer-ring drive mechanism RPT is eliminated, and thus deflection of the spring SP is instantaneously eliminated. The force applied when the spring SP is released is not transmitted to the outer-ring drive mechanism RPT, and hence failure is less likely to occur. The spring SP is compressed when the wire WR is wound around the outer ring OR, and thus a deflection amount of the spring SP is adjusted by the rotation amount of the outer ring OR. A deflection amount is freely controlled by using the rotation amount of the outer ring OR, which makes it easy to downsize the device even with the large deflection amount of the spring SP.

The outer-ring drive mechanism RPT includes the first screw MS, the second screw FS, and the ratchet RT. The second screw FS is threadedly engaged with the first screw MS, and the outer ring OR is caught between the second screw FS and the first screw MS when the first screw MS rotates in the first direction D1. The ratchet RT limits the rotation direction of the second screw FS to the first direction D1.

In this configuration, it is possible to perform switching between transmission and interruption of rotary power to the outer ring OR with a simple configuration. For example, when the first screw MS rotates in the first direction D1, the second screw FS moves in the direction toward the first screw MS (third direction D3), and the outer ring OR is caught between the first screw MS and the second screw FS. Rotary power is supplied to the outer ring OR via the first screw MS and the second screw FS in close contact with the outer ring OR, and the outer ring OR rotates in the first direction D1 in conjunction with the first screw MS and the second screw FS. When the first screw MS rotates in the second direction D2, the second screw FS moves in the direction away from the first screw MS (fourth direction D4), and the outer ring OR is released from the close contact with the first screw MS and the second screw FS. As a result, the connection between the outer ring OR and the first screw MS and the second screw FS is eliminated, and the stress applied to the outer ring OR is removed. Consequently, the outer ring OR can freely rotate.

The spring expansion/compression mechanism SM includes the first motor MT1. The first motor MT1 can rotate the first screw MS in the first direction D1 and the second direction D2 opposite to the first direction D1.

With this configuration, the small spring expansion/compression mechanism SM using the first motor MT1 as a source of rotary power is provided.

The spring expansion/compression mechanism SM includes the adjustment mechanism AM that adjusts the orientation of the spring SP.

With this configuration, the restoring force of the spring SP can be exerted in an appropriate direction.

The adjustment mechanism AM includes the casing CS and the second motor MT2. The casing CS includes the hollow spring shaft SA through which the wire WR is inserted. The second motor MT2 rotates the casing CS.

With this configuration, the orientation of the spring SP can be adjusted by a simple configuration.

Note that the effects described in the present specification are mere examples and are not limitative, and other effects may be produced.

2. First Application Example of Spring Expansion/Compression Mechanism

Below, an example in which the spring expansion/compression mechanism SM is applied to a robot will be described.

2-1. Configuration of Robot

Figure 13:
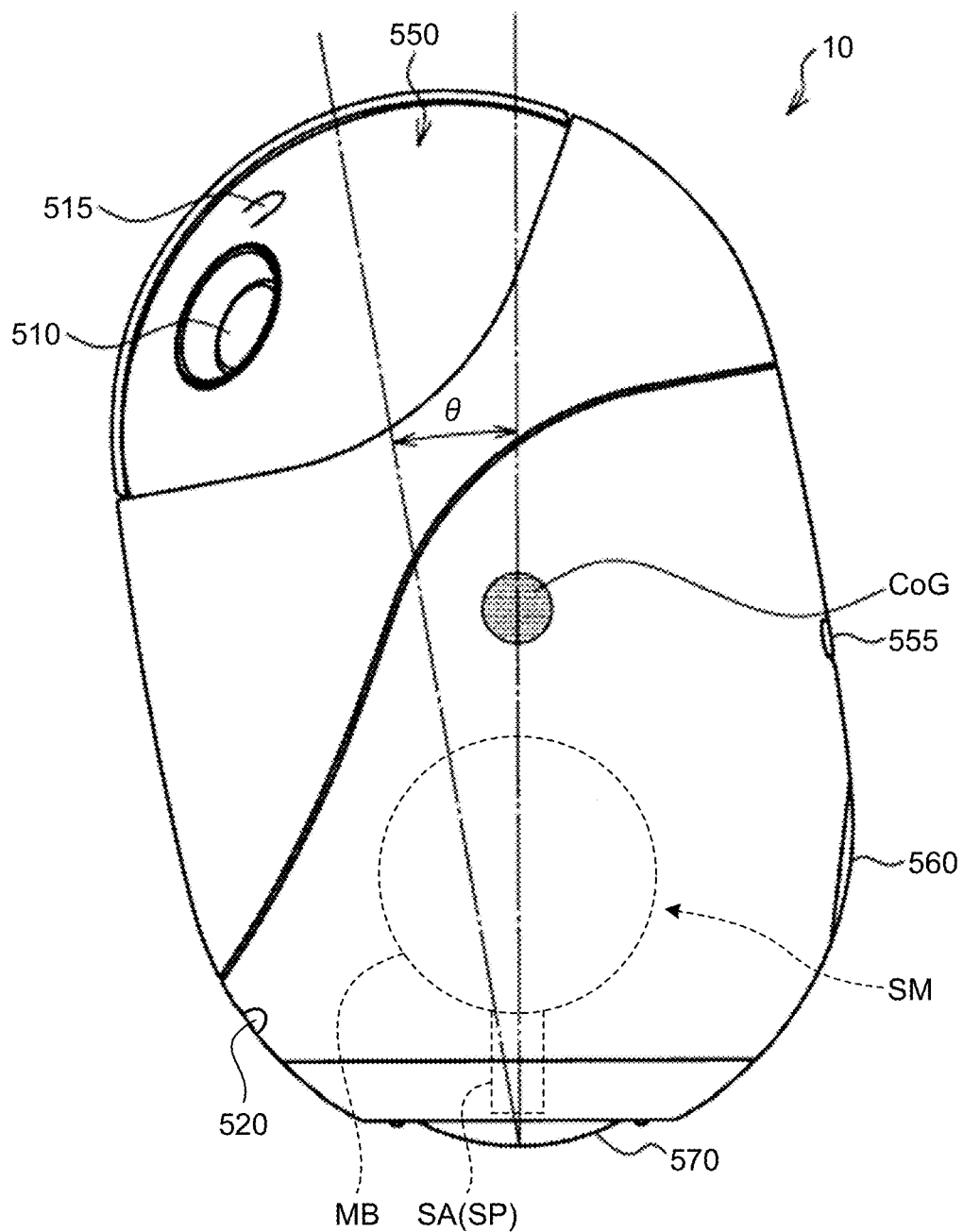
FIG. 13 is a view illustrating a configuration of an autonomous mobile object that is an example of a robot.

FIG. 13 is a view illustrating a configuration of an autonomous mobile object 10 that is an example of a robot. The autonomous mobile object 10 is an elongated-oblong agent robot that autonomously travels with wheels. The autonomous mobile object 10, for example, performs an autonomous operation based on a user, surroundings, or its own situation, to realize various types of communication including information presentation. The autonomous mobile object 10 may be a small robot having such a size and a weight that a user can lift it up easily with one hand. The autonomous mobile object 10 includes the above-described spring expansion/compression mechanism SM for use in an operation of avoiding an obstacle, impact absorption at the time of falling, an operation of recovering from an overturned state, and the like.

FIG. 13 is a side view of the autonomous mobile object 10. The autonomous mobile object 10 includes two eye portions 510 corresponding to a right eye and a left eye in an upper portion of a main body. The eye portions 510 are implemented by, for example, an LED or the like, and can express the line of sight, blinks, and the like. Note that the eye portions 510 are not limited to the above-described example, and may be implemented by, for example, a single organic light emitting diode (OLED) or two independent OLEDs, or the like.

The autonomous mobile object 10 includes two cameras 515 above the eye portions 510. The cameras 515 have each a function of capturing images of a user and surrounding environment. Further, the autonomous mobile object 10 can realize simultaneous localization and mapping (SLAM) on the basis of images captured by the cameras 515.

The eye portions 510 and the cameras 515 are placed on a substrate 505 provided inside a surface of an exterior. While the surface of the exterior of the autonomous mobile object 10 is basically formed using an opaque material, a portion corresponding to the substrate 505 on which the eye portions 510 and the cameras 515 are placed is provided with a head cover 550 that uses a transparent or semi-transparent material. This allows a user to recognize the eye portions 510 of the autonomous mobile object 10, and further allows the autonomous mobile object 10 to capture images of the outside world.

The autonomous mobile object 10 includes a ToF sensor 520 in a lower portion of a front surface thereof. The ToF sensor 520 has a function of detecting a distance to an object present ahead. With the ToF sensor 520, distances to various objects can be detected with high accuracy, and it is possible to prevent falling or overturning by detecting steps or the like.

The autonomous mobile object 10 may include a connection terminal 555 of an external device and a power switch 560 in a back surface thereof. The autonomous mobile object 10 can be connected to an external device via the connection terminal 555 to perform information communication.

The autonomous mobile object 10 includes two wheels 570 in a bottom surface thereof. The two wheels 570 are driven by different motors, respectively. Thus, the autonomous mobile object 10 can realize a moving operation such as forward movement, backward movement, turning, and rotating. The wheels 570 are provided in such a manner that they can be stored in the main body and can protrude outward. The autonomous mobile object 10 can also perform a jumping operation by causing the two wheels 570 to forcefully protrude outward, for example.

The autonomous mobile object 10 performs a moving operation such as a back-and-forth motion, a turning motion, and a rotational motion while keeping leaning forward. For example, the autonomous mobile object 10 performs a moving operation while leaning forward at an angle θ with respect to the vertical direction. The angle θ is, for example, 10°. An operation control unit 160 described later controls the moving operation of the autonomous mobile object 10 such that a center of gravity CoG of the autonomous mobile object 10 is located on a line vertical to the rotation axis of the wheels 570.

Figure 14:
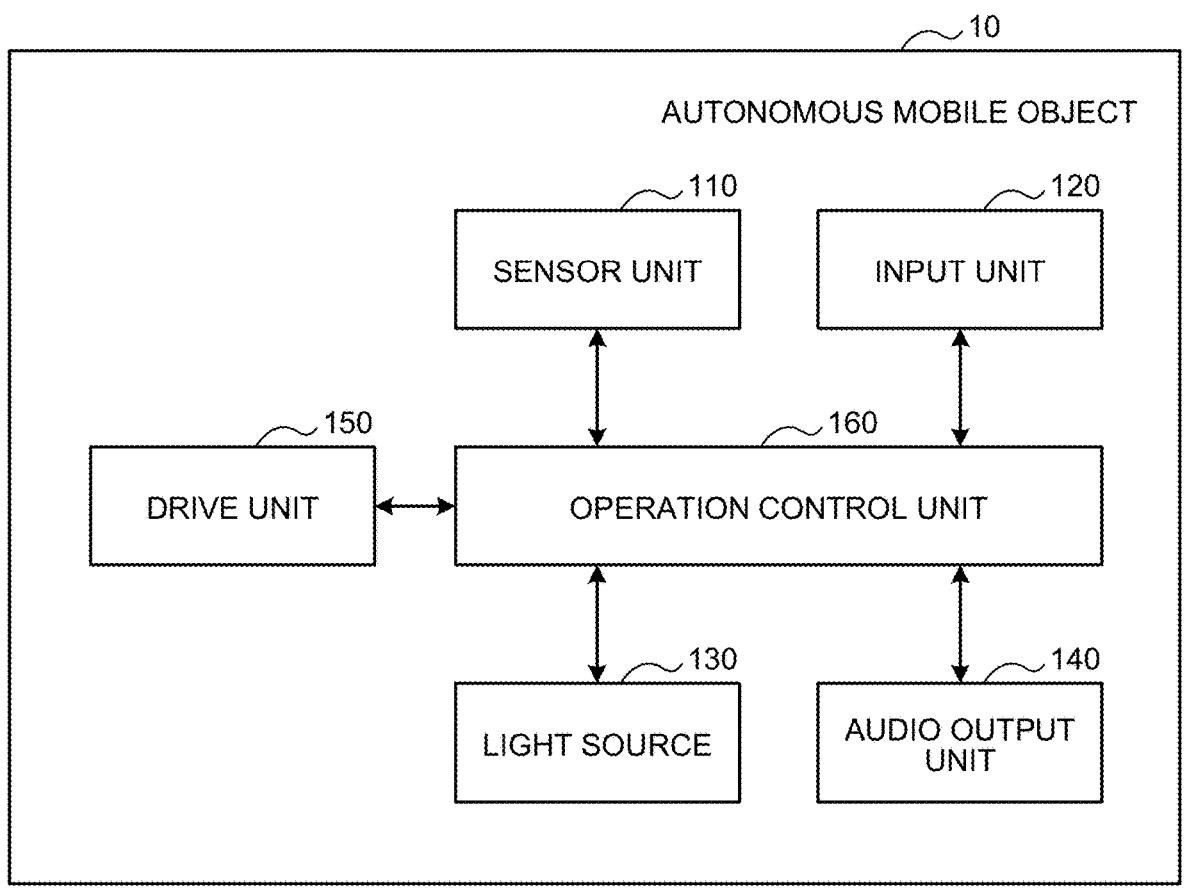
FIG. 14 is a block diagram illustrating an example of a functional configuration of the autonomous mobile object.

FIG. 14 is a block diagram illustrating an example of a functional configuration of the autonomous mobile object 10.

The autonomous mobile object 10 includes a sensor unit 110, an input unit 120, a light source 130, an audio output unit 140, a drive unit 150, and the operation control unit 160.

The sensor unit 110 has a function of collecting various kinds of sensor information regarding a user and surroundings. To this end, the sensor unit 110 includes the cameras 515, the ToF sensor 520, a microphone, an inertial measurement unit (IMU), and the like, for example. The sensor unit 110 may include various sensors such as a geomagnetic sensor, a touch sensor, various light sensors including an infrared sensor and the like, a temperature sensor, and a humidity sensor, for example, in addition to the above-described sensors.

The input unit 120 has a function of detecting a physical inputting operation performed by a user. The input unit 120 includes a button such as the power switch 560, for example.

The light source 130 expresses eyeball movement of the autonomous mobile object 10. To this end, the light source 130 includes the two eye portions 510.

The audio output unit 140 has a function of outputting various sounds including a voice. To this end, the audio output unit 140 includes a speaker 535, an amplifier, and the like.

The drive unit 150 expresses body motion of the autonomous mobile object 10. To this end, the drive unit 150 includes the two wheels 570, a plurality of motors for driving the wheels, the spring expansion/compression mechanism SM, and the like.

The operation control unit 160 has a function of controlling each component included in the autonomous mobile object 10. For example, the operation control unit 160 performs motion planning on the basis of sensor information collected by the sensor unit 110, and controls eyeball expression by the light source 130 and audio output by the audio output unit 140. Further, the operation control unit 160 may control the operation of the drive unit 150 on the basis of the motion planning described above.

Figure 15:
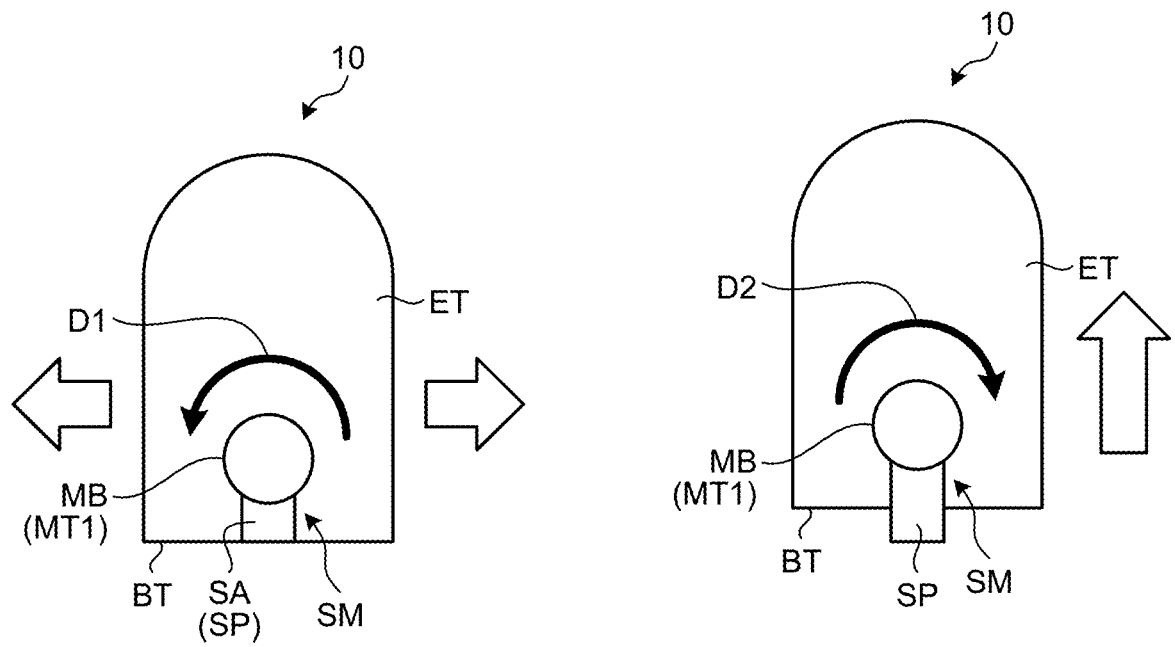
FIG. 15 is a view illustrating an example of control of the spring expansion/compression mechanism by an operation control unit.

FIG. 15 is a view illustrating an example of control of the spring expansion/compression mechanism SM by the operation control unit 160.

In the example of FIG. 15, the spring SP is compressed and expanded by control of the rotation direction of the first motor MT1. The state illustrated on the left side in FIG. 15 is a state in which the outer ring OR is rotated in the first direction D1 by the first motor MT1 and the spring SP is compressed. In this state, the spring SP does not protrude from a bottom portion BT of an exterior ET of the autonomous mobile object 10. Thus, the autonomous mobile object 10 can move with the wheels 570, undisturbed by the spring SP.

The state illustrated on the right side in FIG. 15 is a state in which the outer ring OR is rotated in the second direction D2 by the first motor MT1 and the spring SP is released from compression. In this state, the spring SP protrudes from the bottom portion BT of the exterior ET toward the ground. The autonomous mobile object 10 can jump up by forcefully pressing against the ground using the tip end of the spring SP.

Figure 16:
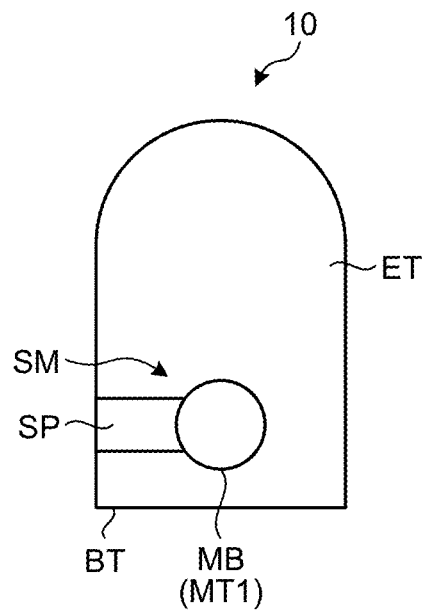
FIG. 16 is a view illustrating another example of control of the spring expansion/compression mechanism.

FIG. 16 is a view illustrating another example of control of the spring expansion/compression mechanism SM.

In the example of FIG. 16, the orientation of the spring SP is adjusted by control of rotation of the second motor MT2. In the example illustrated on the left side in FIG. 15, the autonomous mobile object 10 moves with the spring SP being compressed. In this state, it is necessary to keep applying rotary power to the spring SP at all times during the movement. In the example of FIG. 16, the orientation of the spring SP is changed to horizontal. In this configuration, even with the spring SP being expanded, the spring SP does not protrude from the bottom portion BT of the exterior ET. The autonomous mobile object 10 can move, undisturbed by the spring SP, without applying rotary power to the spring SP. Therefore, power consumption is reduced.

Figure 17:
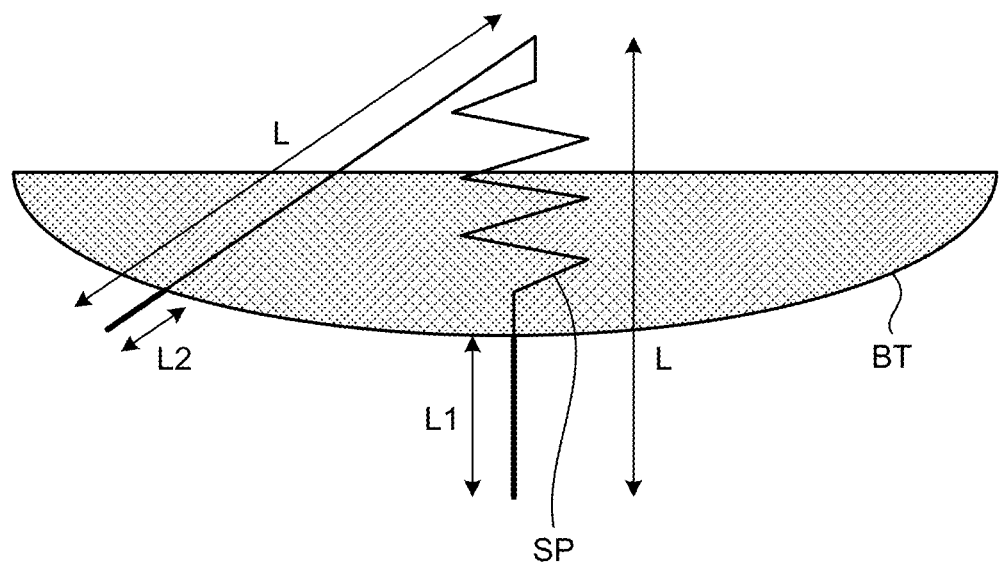
FIG. 17 is a view illustrating an example of a shape of a bottom portion of an exterior.
Figure 18:
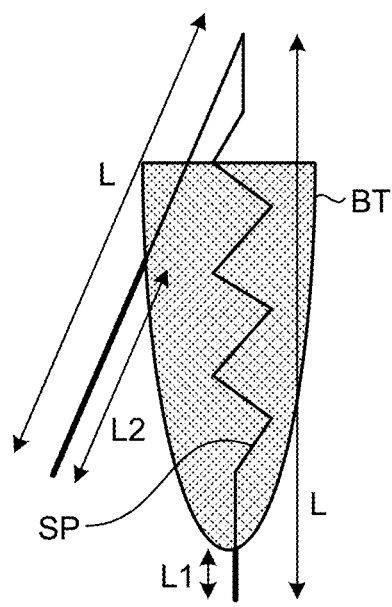
FIG. 18 is a view illustrating an example of the shape of the bottom portion of the exterior.

FIGS. 17 and 18 are views illustrating an example of the shape of the bottom portion BT of the exterior ET.

The reference sign L represents the natural length of the spring SP. The reference sign L1 represents a length by which the spring SP protrudes from the bottom portion BT when the spring SP being oriented vertically downward is expanded from the bottom portion BT toward the ground.

The reference sign L2 represents a length by which the spring SP protrudes from the bottom portion BT when the spring SP being inclined with respect to the vertical direction is expanded from the bottom portion BT toward the ground.

FIG. 17 illustrates an example in which the lateral width of the bottom portion BT is larger than the height. In the example of FIG. 17, the length L1 is larger than the length L2. Hence, force of jumping straight up is stronger than force of jumping up obliquely. FIG. 18 illustrates an example in which the lateral width of the bottom portion BT is smaller than the height. In the example of FIG. 18, the length L2 is larger than the length L1. Hence, force of jumping up obliquely is stronger than force of jumping straight up. Thus, by adjusting the shape of the bottom portion BT, it is possible to vary force of jumping depending on a jumping direction.

The operation control unit 160 controls a deflection amount (compression amount), an expansion direction, and an expansion timing of the spring SP on the basis of a situation of the autonomous mobile object 10. Various situations can be considered as triggers of control. Examples of the above-described situation include a passive situation such as a change in the operation environment, an active situation such as interaction with others, and the like. With this configuration, the spring expansion/compression mechanism SM can be caused to perform an appropriate operation based on a situation of the autonomous mobile object 10. Below, an example of control of the spring expansion/compression mechanism SM based on a situation will be described.

2-2. Operation of Climbing Over Obstacle

Figure 19:
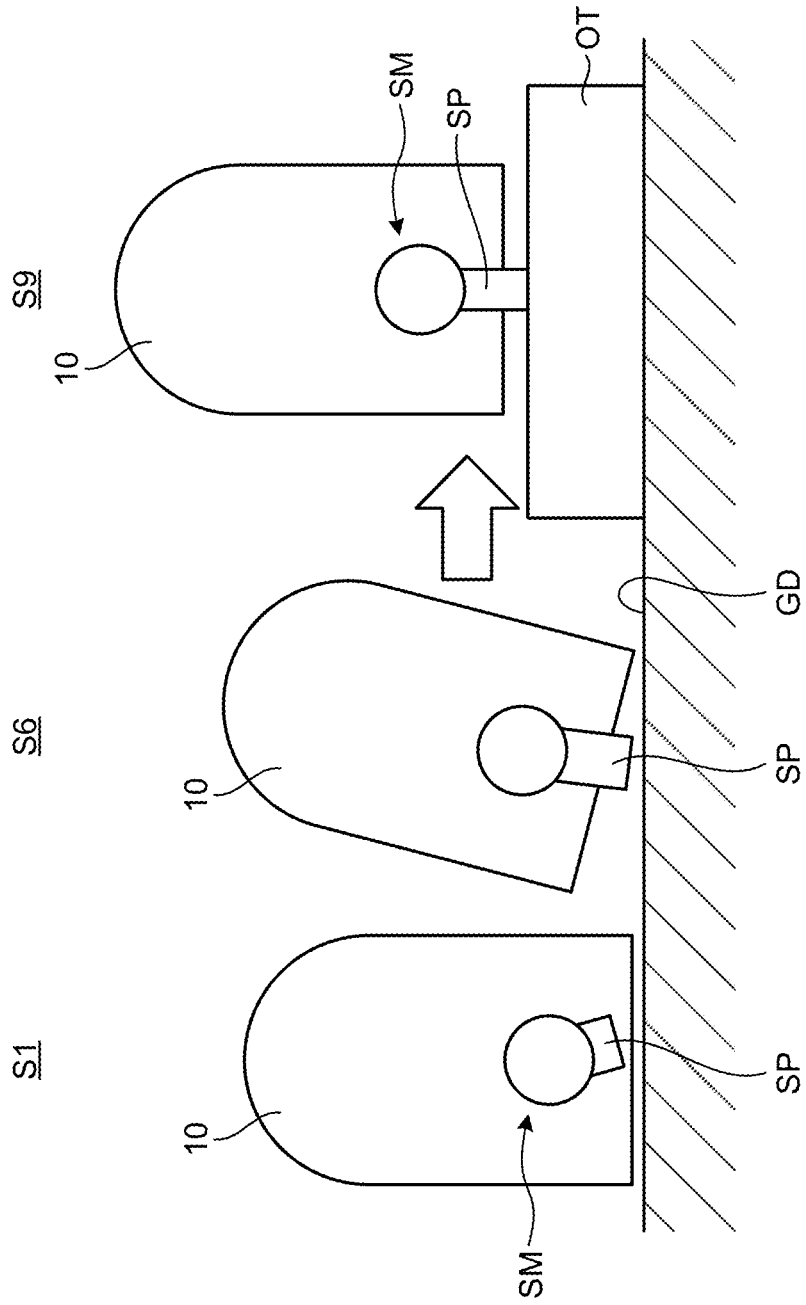
FIG. 19 is a view illustrating an example in which the spring expansion/compression mechanism is used for an operation of climbing over an obstacle.

FIG. 19 is a view illustrating an example in which the spring expansion/compression mechanism SM is used for an operation of climbing over an obstacle OT.

When the operation control unit 160 detects a situation in which the obstacle OT is present in front of the autonomous mobile object 10 on the basis of images of the cameras 515, the operation control unit 160 calculates a deflection amount of the spring SP on the basis of the height of the obstacle OT. The operation control unit 160 calculates an expansion direction and an expansion timing of the spring SP on the basis of a distance to the obstacle OT. With this configuration, the autonomous mobile object 10 can be caused to climb over the obstacle OT.

Figure 20:
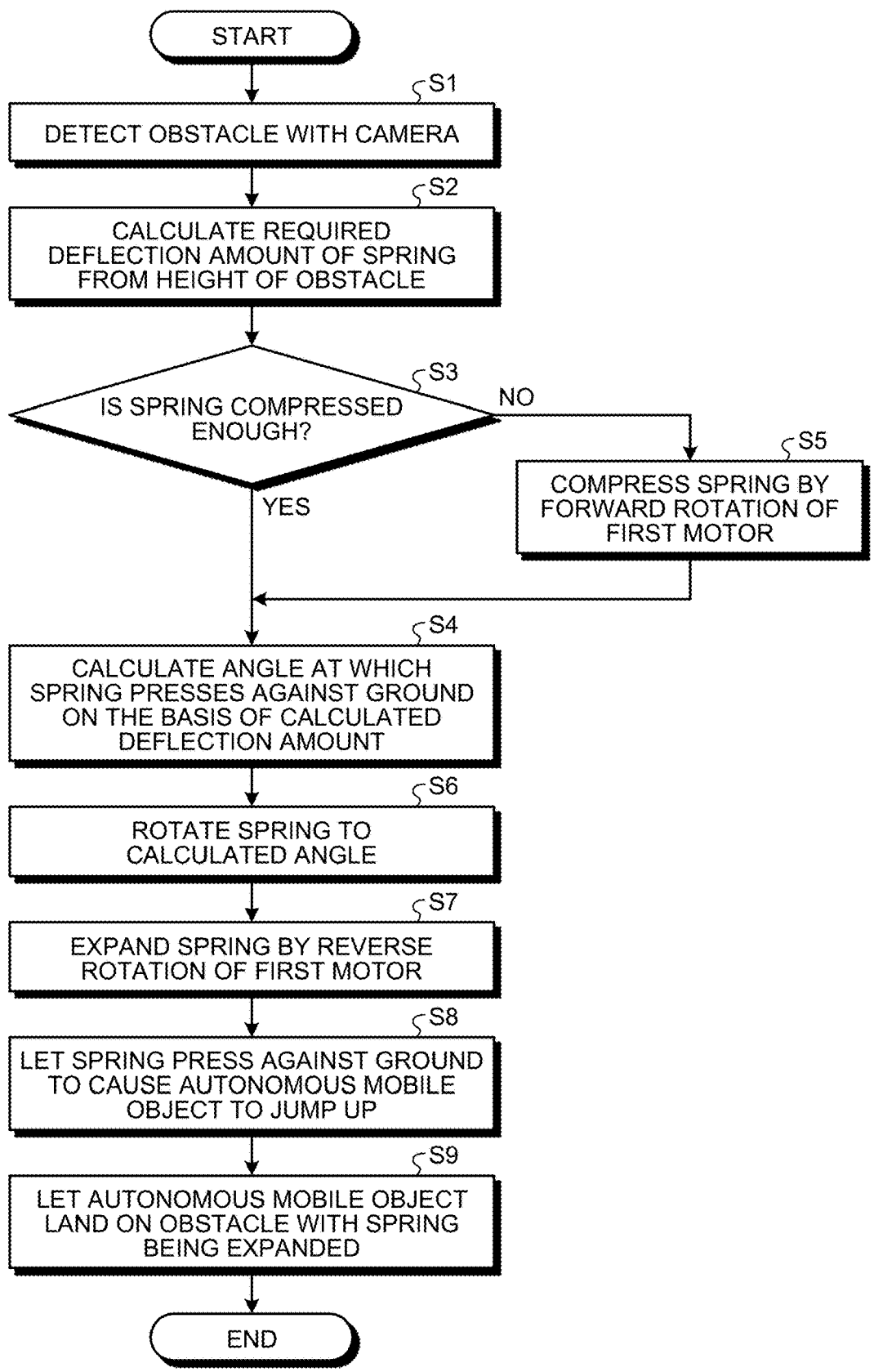
FIG. 20 is a view illustrating a flow of control performed by the operation control unit.

FIG. 20 is a view illustrating a flow of control performed by the operation control unit 160.

In a step S1, the operation control unit 160 detects the obstacle OT present ahead in a direction of movement using the cameras 515. In a step S2, the operation control unit 160 calculates a deflection amount of the spring SP required for jumping onto the obstacle OT, from the height of the obstacle OT. In a step S3, the operation control unit 160 determines whether the spring SP is currently compressed enough for the autonomous mobile object 10 to jump onto the obstacle OT.

When it is determined in the step S3 that the spring SP is compressed enough (step S3: Yes), the process proceeds to a step S4. When it is determined in the step S3 that the spring SP is not compressed enough (step S3: No), the process proceeds to a step S5. In the step S5, the operation control unit 160 causes forward rotation of the first motor MT1 and sufficiently compresses the spring SP. Then, the process proceeds to the step S4.

In the step S4, the operation control unit 160 calculates an angle at which the spring SP presses against the ground GD on the basis of the calculated deflection amount. Subsequently, in a step S6, the operation control unit 160 rotates the spring SP to the calculated angle using the second motor MT2. In a step S7, the operation control unit 160 causes reverse rotation of the first motor MT1, to cause the spring SP to forcefully expand. As a result, in a step S8, the spring SP presses against the ground GD, and the autonomous mobile object 10 jumps up. Then, in a step S9, the autonomous mobile object 10 lands on the obstacle OT with the spring SP being expanded. The expanded spring SP absorbs impact at the time of landing.

2-3. Impact Absorption at the Time of Falling

Figure 21:
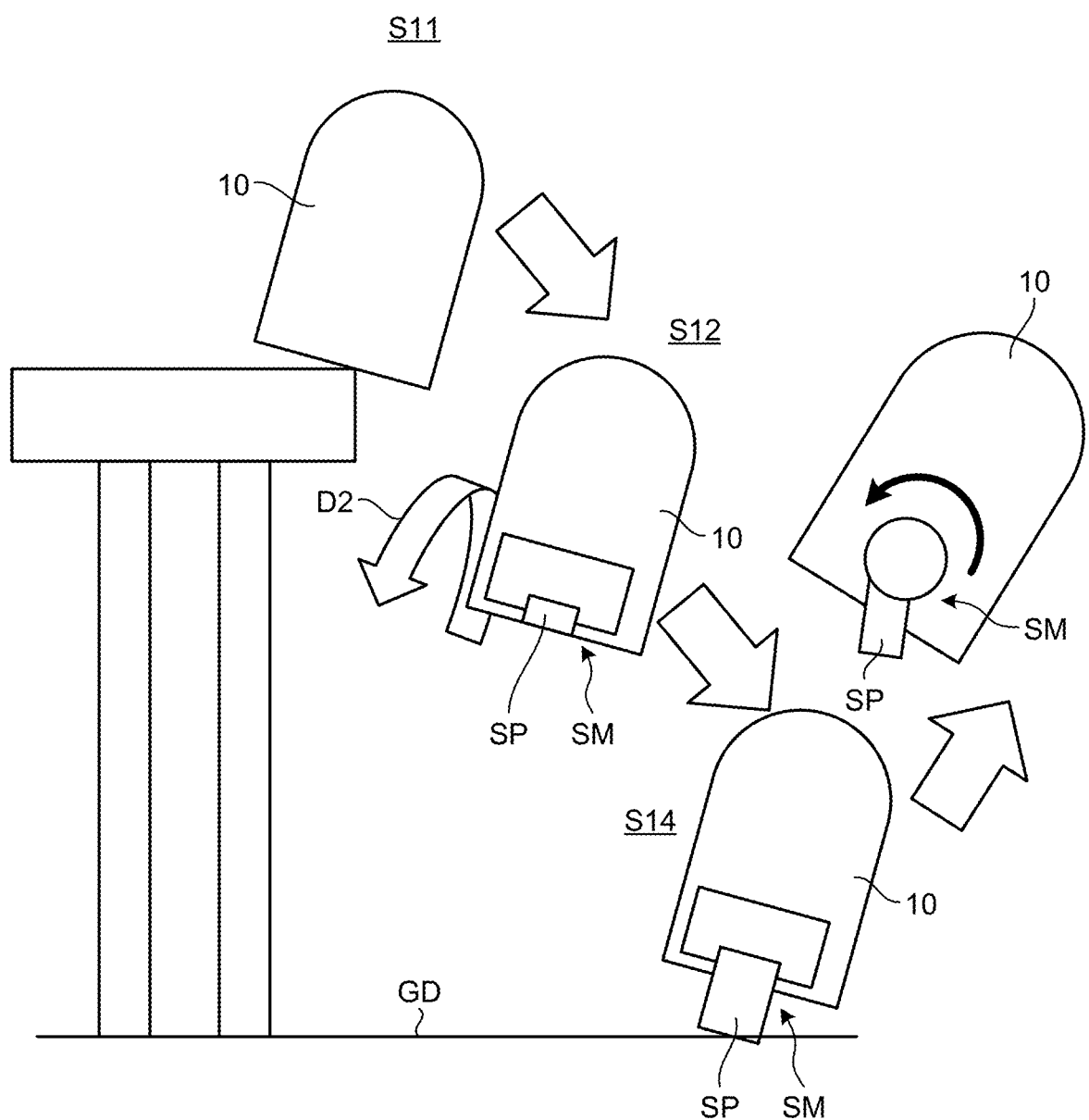
FIG. 21 is a view illustrating an example in which the spring expansion/compression mechanism is used for absorbing impact at the time of falling.

FIG. 21 is a view illustrating an example in which the spring expansion/compression mechanism SM is used for absorbing impact at the time of falling.

When the operation control unit 160 detects a situation in which the autonomous mobile object 10 is falling on the basis of measurement data of the IMU, the operation control unit 160 calculates a direction in which the autonomous mobile object 10 is to land, as an expansion direction. The operation control unit 160 causes the spring SP to expand before the autonomous mobile object 10 lands. With this configuration, impact caused by falling can be absorbed by the spring SP.

Figure 22:
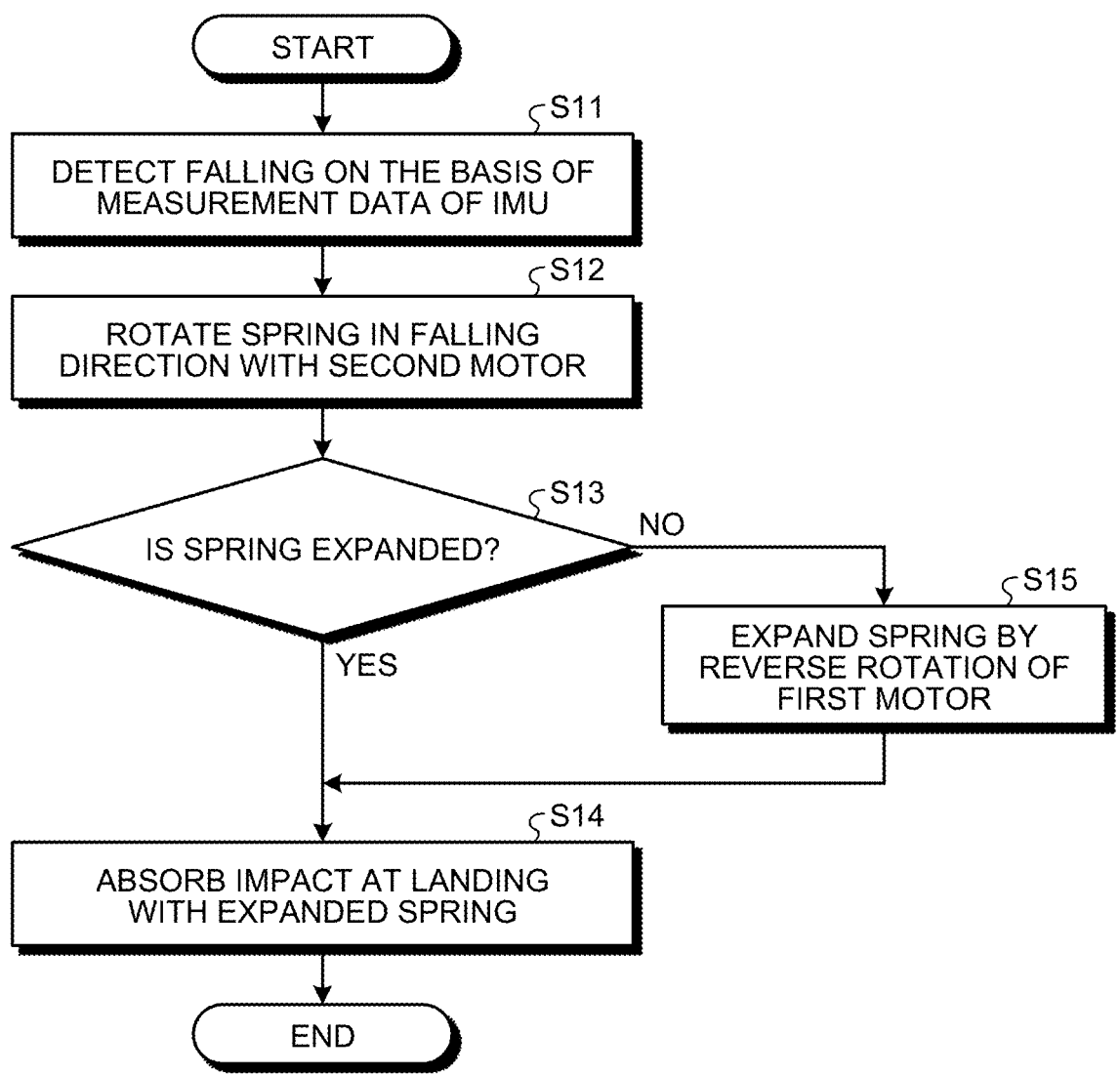
FIG. 22 is a view illustrating a flow of control performed by the operation control unit.

FIG. 22 is a view illustrating a flow of control performed by the operation control unit 160.

In a step S11, the operation control unit 160 detects that the autonomous mobile object 10 is falling on the basis of measurement data of the IMU. In a step S12, the operation control unit 160 rotates the spring SP in the direction in which the autonomous mobile object 10 is falling, by using the second motor MT2. In a step S13, the operation control unit 160 determines whether the spring SP is currently expanded (whether the spring SP is not compressed).

When it is determined in the step S13 that the spring SP is expanded (step S13: Yes), the process proceeds to a step S14. When it is determined in the step S13 that the spring SP is not expanded (is compressed) (step S13: No), the process proceeds to a step S15. In the step S15, the operation control unit 160 causes reverse rotation of the first motor MT1, to cause the spring SP to expand. Then, the process proceeds to the step S14.

In the step S14, the autonomous mobile object 10 lands on the ground GD with the spring SP being expanded. The impact at the time of landing is absorbed by the expanded spring SP.

2-4. Operation of Recovering from Overturned State

FIG. 23 is a view illustrating an example in which the spring expansion/compression mechanism SM is used for an operation of recovering from an overturned state.

When the operation control unit 160 detects a situation in which the autonomous mobile object 10 is overturned on the basis of measurement data of the IMU, the operation control unit 160 calculates a deflection amount and an expansion direction of the spring SP for raising the autonomous mobile object 10. With this configuration, it is possible to raise the autonomous mobile object 10 having been overturned.

Figure 24:
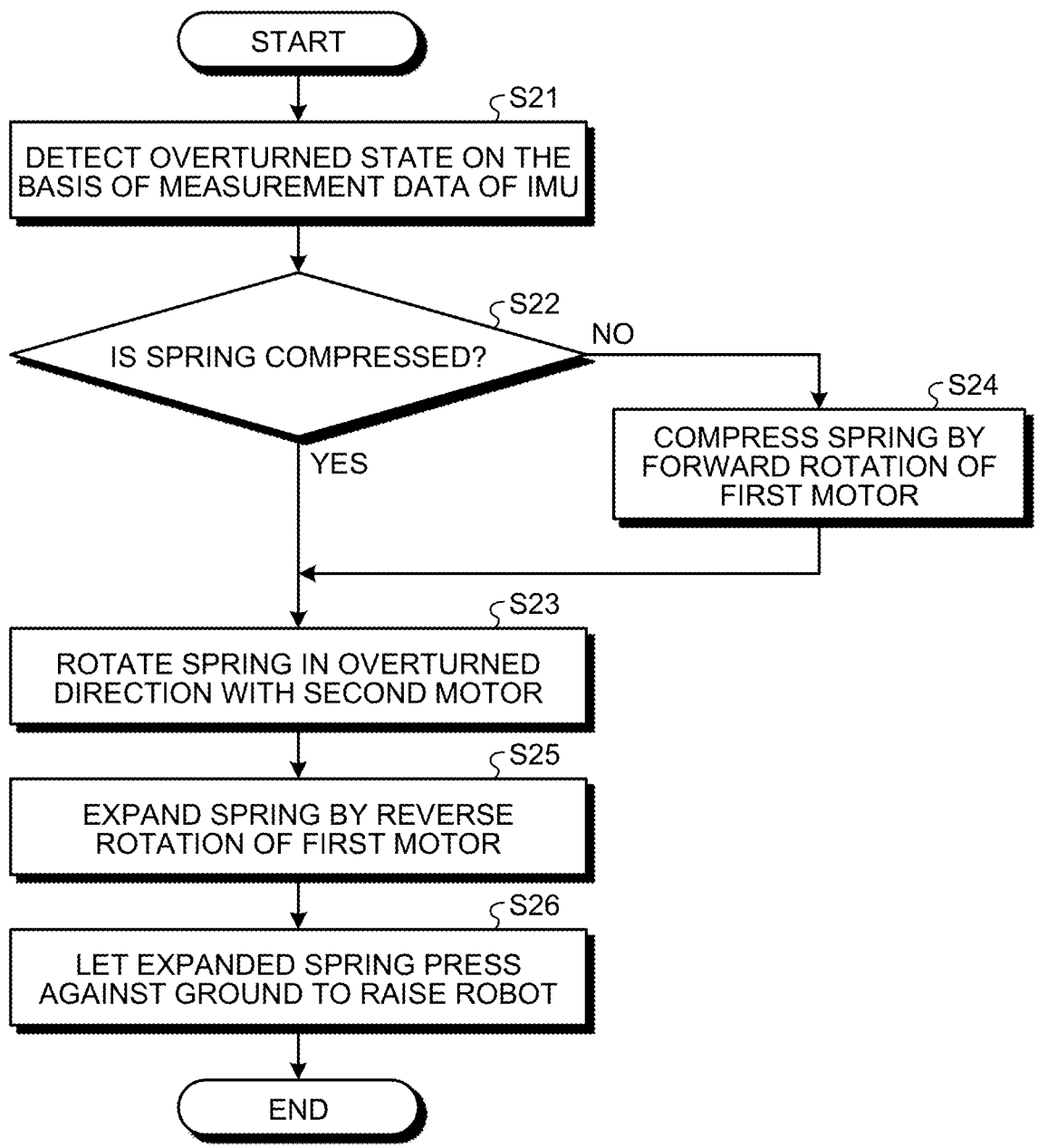
FIG. 24 is a view illustrating a flow of control performed by the operation control unit.

FIG. 24 is a view illustrating a flow of control performed by the operation control unit 160.

In a step S21, the operation control unit 160 detects that the autonomous mobile object 10 is overturned on the basis of measurement data of the IMU. In a step S22, the operation control unit 160 determines whether the spring SP is currently compressed enough to raise the autonomous mobile object 10.

When it is determined in the step S22 that the spring SP is compressed enough (step S22: Yes), the process proceeds to a step S23. When it is determined in the step S22 that the spring SP is not compressed enough (step S22: No), the process proceeds to a step S24. In the step S24, the operation control unit 160 causes forward rotation of the first motor MT1, to compress the spring SP by an amount required for raising the autonomous mobile object 10. Then, the process proceeds to the step S23.

In the step S23, the operation control unit 160 rotates the spring SP in the direction in which the autonomous mobile object 10 is overturned, by using the second motor MT2. The operation control unit 160 calculates an inclination angle of the spring SP required for raising the autonomous mobile object 10, and rotates the spring SP until the spring SP is inclined at the calculated angle with respect to the ground GD.

Subsequently, in a step S25, the operation control unit 160 causes reverse rotation of the first motor MT1, to cause the spring SP to forcefully expand. As a result, in a step S26, the spring SP presses against the ground GD, and the autonomous mobile object 10 gets up.

2-5. Examples of Application to Other Operations

Figure 25:
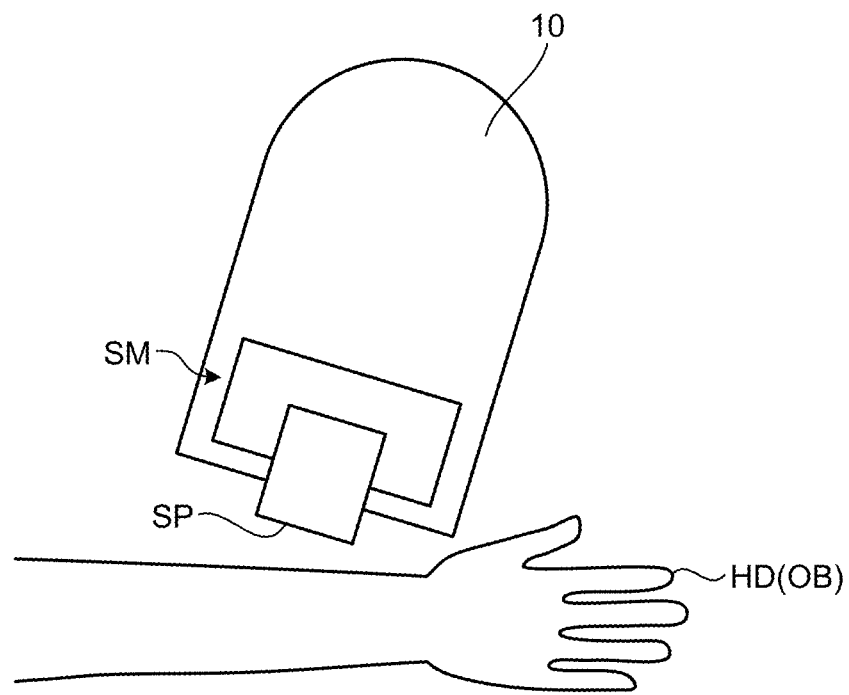
FIG. 25 is a view illustrating an example in which the spring expansion/compression mechanism is applied to another operation of the autonomous mobile object.
Figure 26:
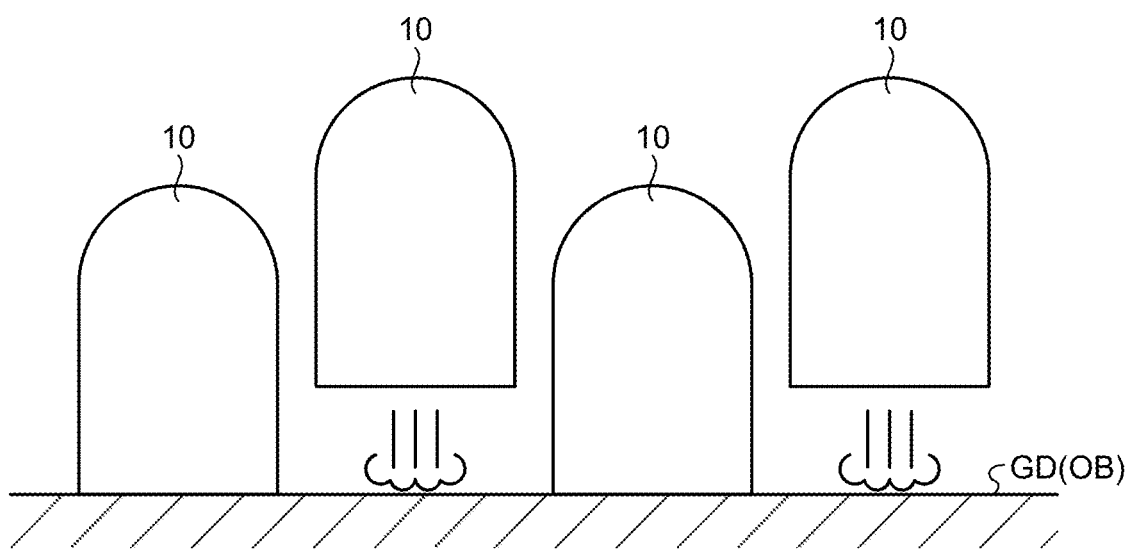
FIG. 26 is a view illustrating an example in which the spring expansion/compression mechanism is applied to another operation of the autonomous mobile object.

FIGS. 25 and 26 are views illustrating examples in which the spring expansion/compression mechanism SM is applied to other operations of the autonomous mobile object 10.

In the examples in FIGS. 25 and 26, the spring expansion/compression mechanism SM is used to attract a user's attention. For example, in the example in FIG. 25, the autonomous mobile object 10 gently taps a hand HD of the user to call the user's attention by the sense of touch. The autonomous mobile object 10 may tap a desk to make a sound, in order to call the user's attention by the sense of hearing. In the example in FIG. 26, the autonomous mobile object 10 bounces with a constant rhythm to call a user's attention by the sense of sight.

When the operation control unit 160 detects a situation in which it is necessary to attract a user's attention, the operation control unit 160 controls a deflection amount, an expansion direction, and an expansion timing of the spring SP depending on things that are desired to be recognized by the user and the type of an object OB with which the expanded spring SP is to collide. With this configuration, it is possible to attract the user's attention by motion of the autonomous mobile object 10 caused by expansion and compression of the spring SP.

For example, in the example in FIG. 25, the object OB that is a collision target is the hand HD of the user. Thus, stress at the time of release (a deflection amount of the spring SP) is set to a minimized value within a range that can be recognized by the user. In the example in FIG. 26, the object OB that is a collision target is the ground GD. In a case where the ground GD is formed of a hard material, the spring SP can be caused to jump high by being greatly compressed.

Figure 27:
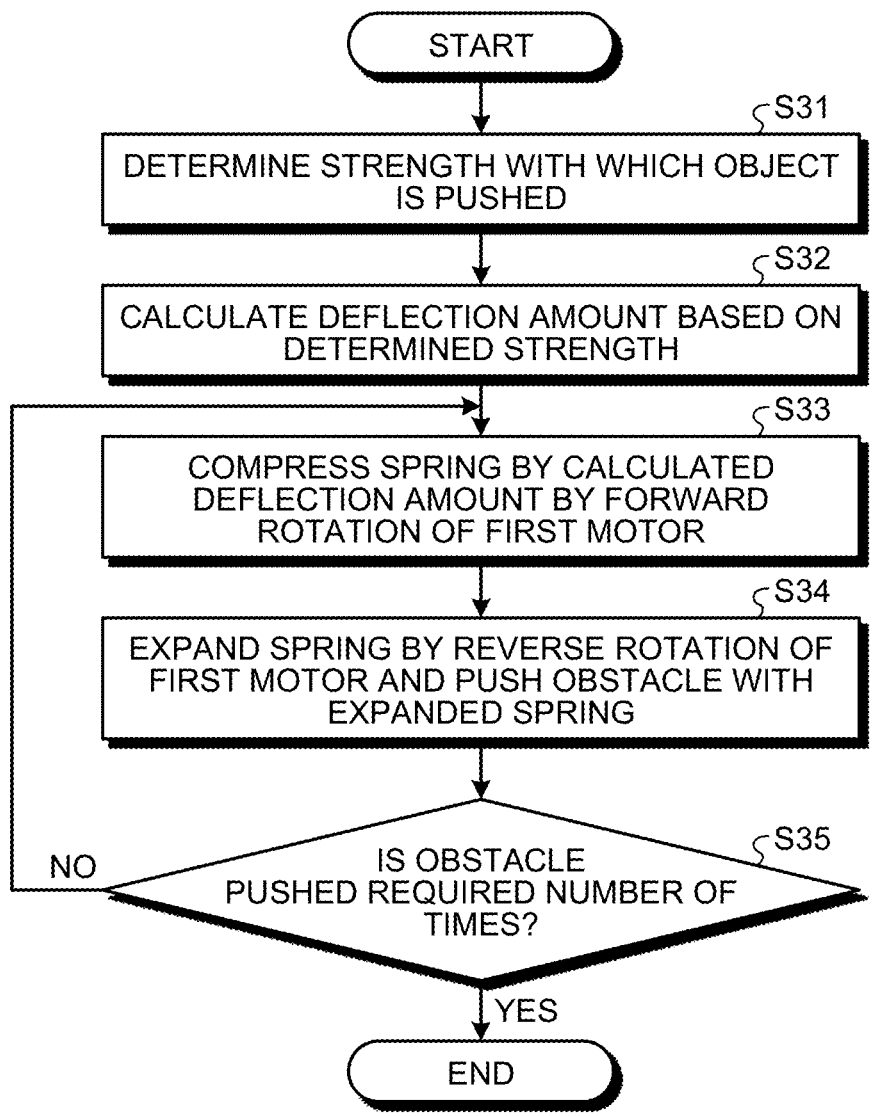
FIG. 27 is a view illustrating a flow of control for calling a user's attention.

FIG. 27 is a view illustrating a flow of control for calling a user's attention.

In a step S31, the operation control unit 160 determines strength with which the object OB that is a collision target is pushed. In a step S32, the operation control unit 160 calculates a deflection amount of the spring SP based on the determined strength. In a step S33, the operation control unit 160 causes forward rotation of the first motor MT1 to compress the spring SP by the calculated deflection amount. In a step S34, the operation control unit 1600 causes reverse rotation of the first motor MT1 to forcefully expand the spring SP, and pushes the object OB with the expanded spring SP.

In a step S35, the operation control unit 160 determines whether the object OB is pushed the required number of times. When it is determined in the step S35 that the object OB has been pushed the required number of times (step S35: Yes), the process ends. When it is determined in the step S35 that the object OB has not been pushed the required number of times (step S35: No), the process returns to the step S33, and the above-described process is repeated until the object OB is pushed the required number of times.

2-6. Effects

The autonomous mobile object 10 includes the spring expansion/compression mechanism SM and the operation control unit 160. With this configuration, there is provided the autonomous mobile object 10 that is small and is less susceptible to failure while being capable of adjusting a deflection amount of the spring SP.

3. Second Application Example of Spring Expansion/Compression Mechanism

Below, an example in which the spring expansion/compression mechanism SM is applied to an electronic device ED will be described. The electronic device ED includes the spring expansion/compression mechanism SM and an operation control unit. The operation control unit controls the spring expansion/compression mechanism SM, and has a configuration similar to that of the operation control unit 160 described above.

3-1. Information Processing Terminal

Figure 28:
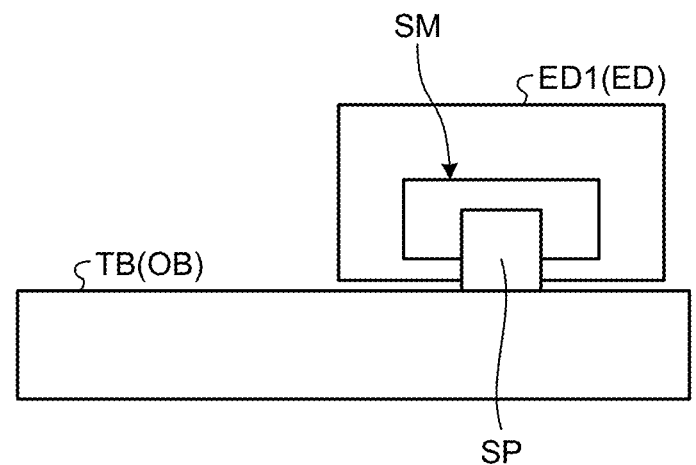
FIG. 28 is a view illustrating an example in which the spring expansion/compression mechanism is applied to an information processing terminal.

FIG. 28 is a view illustrating an example in which the spring expansion/compression mechanism SM is applied to an information processing terminal ED1 such as a smartphone and a tablet terminal. The information processing terminal ED1 includes the spring expansion/compression mechanism SM as a vibration unit. The operation control unit gives notification to a user using vibration generated due to expansion and compression of the spring SP. For example, when an incoming call arrives in the information processing terminal ED1, the spring SP is caused to protrude with a constant rhythm to push the surface of a desk TB or the like on which the information processing terminal ED1 is placed. The user notices arrival of an incoming call through vibration or vibration sounds of the information processing terminal ED1. With this configuration, expansion and compression of the spring SP causes large vibration, and hence notification can be reliably given to a user.

Note that the spring expansion/compression mechanism SM can also be incorporated in a game controller or the like. With this configuration, it is possible to generate so strong vibration that the conventional vibration unit could not make. Therefore, a highly entertaining game is provided.

3-2. Massager

Figure 29:
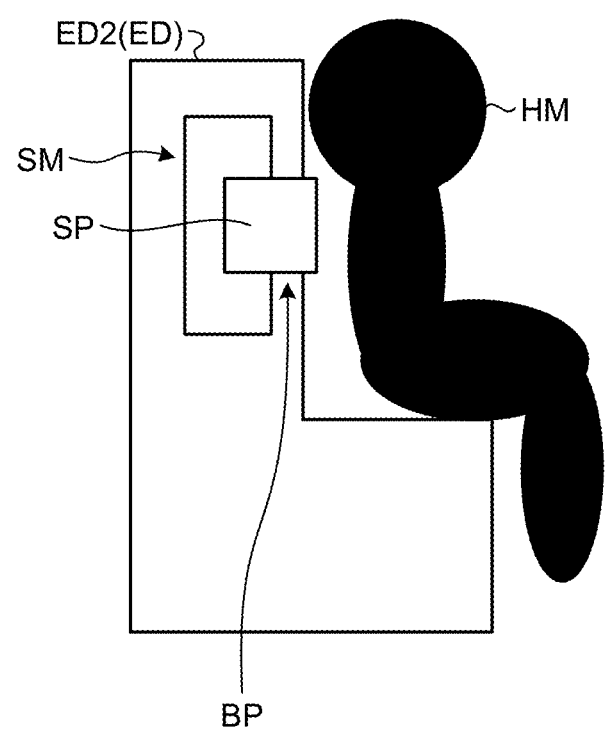
FIG. 29 is a view illustrating an example in which the spring expansion/compression mechanism is applied to a massager.

FIG. 29 is a view illustrating an example in which the spring expansion/compression mechanism SM is applied to a massager ED2. The massager ED2 includes a vibration unit BP that massages an object such as a head, a shoulder, a back, a waist, and a foot of a user HM using vibration generated due to expansion and compression of the spring SP. The spring expansion/compression mechanism SM is incorporated in the vibration unit BP. With this configuration, there is provided the massager ED2 that is small and is capable of controlling the strength of massage by using a deflection amount of the spring SP.

3-3. Sound Device

Figure 30:
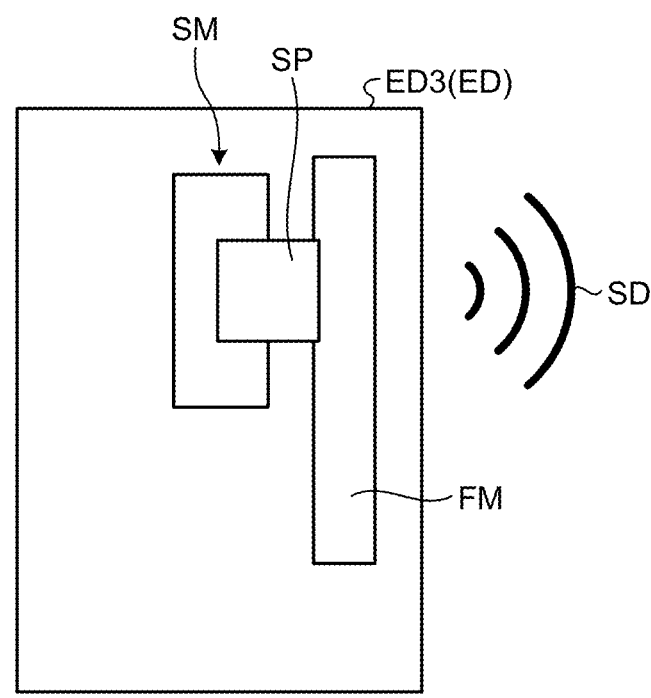
FIG. 30 is a view illustrating an example in which the spring expansion/compression mechanism is applied to a sound device.

FIG. 30 is a view illustrating an example in which the spring expansion/compression mechanism SM is applied to a sound device ED3. The sound device ED3 includes a film FM that vibrates due to expansion and compression of the spring SP and generates a sound SD. The operation control unit controls a deflection amount and an expansion timing of the spring SP on the basis of a sound signal. With this configuration, the spring expansion/compression mechanism SM can be used as a sound source. The intensity of the sound SD can be adjusted using a deflection amount of the spring SP. Thus, the sound device ED3 that is small and is capable of adjusting the intensity of the sound SD is provided. Further, by greatly bending the spring SP, it is possible to generate the strong sound SD that cannot be made by a piezoelectric element or the like. For example, it is also possible to realistically produce a drum sound by beating the film FM in the manner of beating a drum.

3-4. Futon Beater

Figure 31:
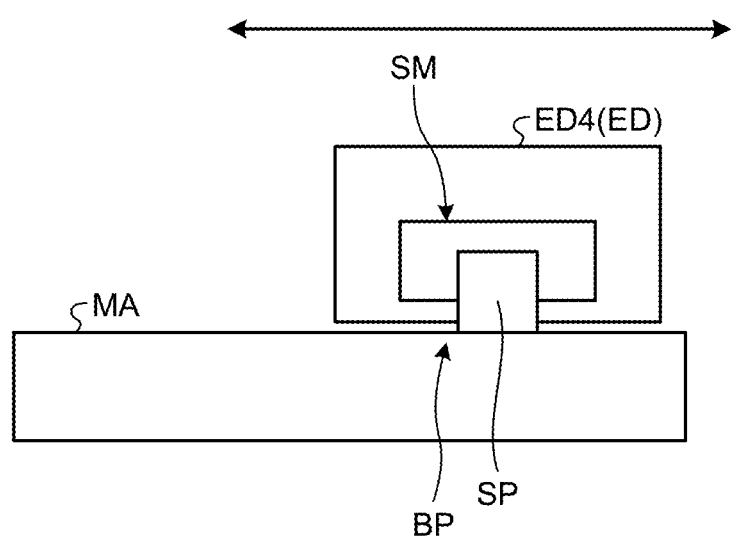
FIG. 31 is a view illustrating an example in which the spring expansion/compression mechanism is applied to a futon beater.

FIG. 31 is a view illustrating an example in which the spring expansion/compression mechanism SM is applied to a futon beater ED4. The futon beater ED4 includes the vibration unit BP that beats futon MA using vibration generated due to expansion and compression of the spring SP. The spring expansion/compression mechanism SM is incorporated in the vibration unit BP. With this configuration, there is provided the futon beater ED4 that is small and is capable of controlling strength with which the futon MA is beaten by using a deflection amount of the spring SP. It is possible to strongly beat the futon MA by greatly bending the spring SP. Thus, dust, mites, and the like can be more effectively removed.

3-5. Effects

The electronic device ED includes the spring expansion/compression mechanism SM of the present disclosure. With this configuration, there is provided the electronic device ED that is small and is less susceptible to failure while being capable of adjusting a deflection amount of a spring.

[Supplementary Note]

Furthermore, the present technology can also have the following configurations.

(1)
A spring expansion/compression mechanism comprising:
an outer ring;
a wire connected to an outer surface of the outer ring;
a spring that is connected to the outer ring via the wire and is compressed when the wire is wound around the outer ring; and
an outer-ring drive mechanism configured to come into close contact with the outer ring to transmit rotary power to the outer ring, and release the outer ring from the close contact to cause the outer ring to freely rotate.

(2)
The spring expansion/compression mechanism according to (1), wherein
the outer-ring drive mechanism includes:
a first screw;
a second screw configured to be threadedly engaged with the first screw and cause the outer ring to be caught between the second screw and the first screw when the first screw rotates in a first direction; and
a ratchet configured to limit a rotation direction of the second screw to the first direction.

(3)
The spring expansion/compression mechanism according to (2), further comprising
a first motor configured to rotate the first screw in the first direction and a second direction opposite to the first direction.

(4)
The spring expansion/compression mechanism according to any one of (1) to (3), further comprising
an adjustment mechanism configured to adjust an orientation of the spring.

(5)
The spring expansion/compression mechanism according to (4), wherein
the adjustment mechanism includes:
a casing including a hollow spring shaft through which the wire is inserted; and
a second motor configured to rotate the casing.

(6)
A robot comprising:
the spring expansion/compression mechanism according to any one of (1) to (5); and
an operation control unit configured to control the spring expansion/compression mechanism.

(7)
The robot according to (6), wherein
the operation control unit controls a deflection amount, an expansion direction, and an expansion timing of the spring on the basis of a situation of the robot.

(8)
The robot according to (7), wherein
when the operation control unit detects a situation in which an obstacle is present in front of the robot on the basis of an image of a camera, the operation control unit calculates the deflection amount of the spring on the basis of a height of the obstacle, and calculates the expansion direction and the expansion timing of the spring on the basis of a distance to the obstacle.

(9)
The robot according to (7), wherein
when the operation control unit detects a situation in which the robot is falling on the basis of measurement data of an IMU, the operation control unit calculates a direction in which the robot is to land as the expansion direction, and causes the spring to expand before the robot lands.

(10)
The robot according to (7), wherein
when the operation control unit detects a situation in which the robot is overturned on the basis of measurement data of an IMU, the operation control unit calculates the deflection amount and the expansion direction of the spring for raising the robot.

(11)
The robot according to (7), wherein
when the operation control unit detects a situation in which it is necessary to attract a user's attention, the operation control unit controls the deflection amount, the expansion direction, and the expansion timing of the spring depending on things that are desired to be recognized by the user and a type of an object with which the expanded spring is to collide.

(12)
An electronic device comprising:
the spring expansion/compression mechanism according to any one of (1) to (5); and
an operation control unit configured to control the spring expansion/compression mechanism.

(13)
The electronic device according to (12), wherein
the operation control unit gives notification to a user using vibration generated due to expansion and compression of the spring.

(14)
The electronic device according to (12), further comprising
a film configured to vibrate due to expansion and compression of the spring and generate a sound, wherein
the operation control unit controls the deflection amount and the expansion timing of the spring on the basis of a sound signal.

(15)
The electronic device according to (12), further comprising
a vibration unit configured to beat or massage an object using vibration generated due to expansion and compression of the spring.

REFERENCE SIGNS LIST

10 AUTONOMOUS MOBILE OBJECT (ROBOT)
160 OPERATION CONTROL UNIT
AM ADJUSTMENT MECHANISM
BP VIBRATION UNIT
CS CASING
ED ELECTRONIC DEVICE
FM FILM
FS SECOND SCREW
MS FIRST SCREW
MT1 FIRST MOTOR
MT2 SECOND MOTOR
OR OUTER RING
OT OBSTACLE
RPT OUTER-RING DRIVE MECHANISM
RT RATCHET
SA SPRING SHAFT
SM SPRING EXPANSION/COMPRESSION MECHANISM
SP SPRING
WR WIRE

The invention claimed is:

1. A spring expansion/compression mechanism comprising:
an outer ring;
a wire connected to an outer surface of the outer ring;
a spring that is connected to the outer ring via the wire and is compressed when the wire is wound around the outer ring; and
an outer-ring drive mechanism configured to come into frictional contact with the outer ring to transmit rotary power to the outer ring, and release the outer ring from the frictional contact to cause the outer ring to freely rotate,
wherein the outer-ring drive mechanism includes:
a first screw;
a second screw configured to be threadedly engaged with the first screw and cause the outer ring to be caught between the second screw and the first screw when the first screw rotates in a first direction; and
a ratchet configured to limit a rotation direction of the second screw to the first direction.

2. The spring expansion/compression mechanism according to claim 1, further comprising
a first motor configured to rotate the first screw in the first direction and a second direction opposite to the first direction.

3. The spring expansion/compression mechanism according to claim 1, further comprising
an adjustment mechanism configured to adjust an orientation of the spring.

4. The spring expansion/compression mechanism according to claim 3, wherein
the adjustment mechanism includes:
a casing including a hollow spring shaft through which the wire is inserted; and
a second motor configured to rotate the casing.

5. A robot comprising:
the spring expansion/compression mechanism according to claim 1; and
an operation controller configured to control the spring expansion/compression mechanism.

6. The robot according to claim 5, wherein
the operation controller controls a deflection amount, an expansion direction, and an expansion timing of the spring on the basis of a situation of the robot.

7. The robot according to claim 6, wherein
when the operation controller detects a situation in which an obstacle is present in front of the robot on the basis of an image of a camera, the operation controller calculates the deflection amount of the spring on the basis of a height of the obstacle, and calculates the expansion direction and the expansion timing of the spring on the basis of a distance to the obstacle.

8. The robot according to claim 6, wherein
when the operation controller detects a situation in which the robot is falling on the basis of measurement data of an inertial measurement unit (IMU), the operation controller calculates a direction in which the robot is to land as the expansion direction, and causes the spring to expand before the robot lands.

9. The robot according to claim 6, wherein
when the operation controller detects a situation in which the robot is overturned on the basis of measurement data of an inertial measurement unit (IMU), the operation controller calculates the deflection amount and the expansion direction of the spring for raising the robot.

10. The robot according to claim 6, wherein
when a user's attention is attracted, the operation controller controls the deflection amount, the expansion direction, and the expansion timing of the spring depending on whether the user's attention is attracted visually, audially, or tactilely and a type of an object approaching the expanded spring.

11. An electronic device comprising:
a spring expansion/compression mechanism; and
an operation controller configured to control the spring expansion/compression mechanism, wherein the spring expansion/compression mechanism includes:
an outer ring;
a wire connected to an outer surface of the outer ring;
a spring that is connected to the outer ring via the wire and is compressed when the wire is wound around the outer ring; and
an outer-ring drive mechanism configured to come into frictional contact with the outer ring to transmit rotary power to the outer ring, and release the outer ring from the frictional contact to cause the outer ring to freely rotate.

12. The electronic device according to claim 11, wherein
the operation controller gives notification to a user using vibration generated due to expansion and compression of the spring.

13. The electronic device according to claim 11, further comprising
a film configured to vibrate due to expansion and compression of the spring and generate a sound, wherein
the operation controller controls the deflection amount and the expansion timing of the spring on the basis of a sound signal.

14. The electronic device according to claim 11, further comprising
a vibration unit configured to beat or massage an object using vibration generated due to expansion and compression of the spring.

* * * * *